US012530075B1

(12) United States Patent
Evangelidis et al.

(10) Patent No.: US 12,530,075 B1
(45) Date of Patent: Jan. 20, 2026

(54) AUGMENTED REALITY (AR) CONTENT-SHARING WITH AR-DEPRIVED AUDIENCE

(71) Applicant: Snap Inc., Santa Monica, CA (US)

(72) Inventors: Georgios Evangelidis, Vienna (AT); Vsevolod Konjahhin, Vienna (AT); Laura Rosalia Luidolt, Vienna (AT); Simon Schreiberhuber, Vienna (AT); Dmytro Siryk, Vienna (AT); Ihor Tymchyshyn, Kyiv (UA); Kai Zhou, Wiener Neudorf (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/950,505

(22) Filed: Nov. 18, 2024

(30) Foreign Application Priority Data

Oct. 4, 2024 (GR) .............................. 20240100695

(51) Int. Cl.
| | | |
|---|---|---|
| *G06F 3/01* | (2006.01) | |
| *G02B 27/01* | (2006.01) | |
| *G06T 7/20* | (2017.01) | |
| *G06T 7/579* | (2017.01) | |
| *G06T 7/70* | (2017.01) | |
| *G06T 19/00* | (2011.01) | |

(52) U.S. Cl.
CPC .......... *G06F 3/011* (2013.01); *G02B 27/0101* (2013.01); *G02B 27/017* (2013.01); *G06T 7/20* (2013.01); *G06T 7/579* (2017.01); *G06T 7/70* (2017.01); *G06T 19/006* (2013.01); *G02B 2027/0138* (2013.01); *G06T 2207/20081* (2013.01); *G06T 2207/30196* (2013.01); *G06T 2207/30204* (2013.01)

(58) Field of Classification Search
CPC . G06F 3/011; G06T 7/579; G06T 7/70; G06T 7/20; G06T 19/006; G06T 2207/20081; G06T 2207/30196; G06T 2207/30204; G02B 27/0101; G02B 27/017; G02B 2027/0138
See application file for complete search history.

(56) References Cited

U.S. PATENT DOCUMENTS

| | | | |
|---|---|---|---|
| 11,877,064 B1* | 1/2024 | Douglas ................. | G02B 30/22 |
| 2021/0356743 A1* | 11/2021 | Muldoon ............ | G06F 3/03547 |
| 2025/0054252 A1* | 2/2025 | Nam ....................... | G06F 3/017 |
| 2025/0218034 A1* | 7/2025 | Forutanpour ......... | G06T 7/0008 |

* cited by examiner

*Primary Examiner* — Doon Y Chow
*Assistant Examiner* — Dennis Chow
(74) *Attorney, Agent, or Firm* — Schwegman Lundberg & Woessner, P.A.

(57) ABSTRACT

A head-worn device system equipped with cameras, display devices, and processors uses stored instructions to facilitate interactions between an augmented reality (AR) device and an external display system. When executed, these instructions establish a communications link between the AR device and the external display. The system identifies the pose of the external display and receives user inputs from the AR device user, relating to interactions with virtual objects in a real-world setting. It also identifies the positions of viewers watching the external display. Based on the external display's pose and the viewer locations, the system generates display data for the virtual object, ensuring it appears correctly on the external display. This display data is then transmitted to the external display system, completing the interaction loop and enhancing the viewing experience for the audience.

20 Claims, 17 Drawing Sheets

AUGMENTED REALITY (AR) CONTENT-SHARING WITH AR-DEPRIVED AUDIENCE

CLAIM OF PRIORITY

This application claims the benefit of priority to Greece Patent Application Serial No. 20240100695, filed on Oct. 4, 2024, which is incorporated herein by reference in its entirety.

TECHNICAL FIELD

The present disclosure relates generally to display devices and, more particularly, to display devices used for augmented and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." Extended Reality (XR) is an umbrella term encapsulating Augmented Reality (AR), Virtual Reality (VR), Mixed Reality (MR), and everything in between.

A user of the head-worn device may access and use a computer software application to perform various tasks or engage in an entertaining activity. To use the computer software application, the user interacts with a 3D user interface provided by the head-worn device.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
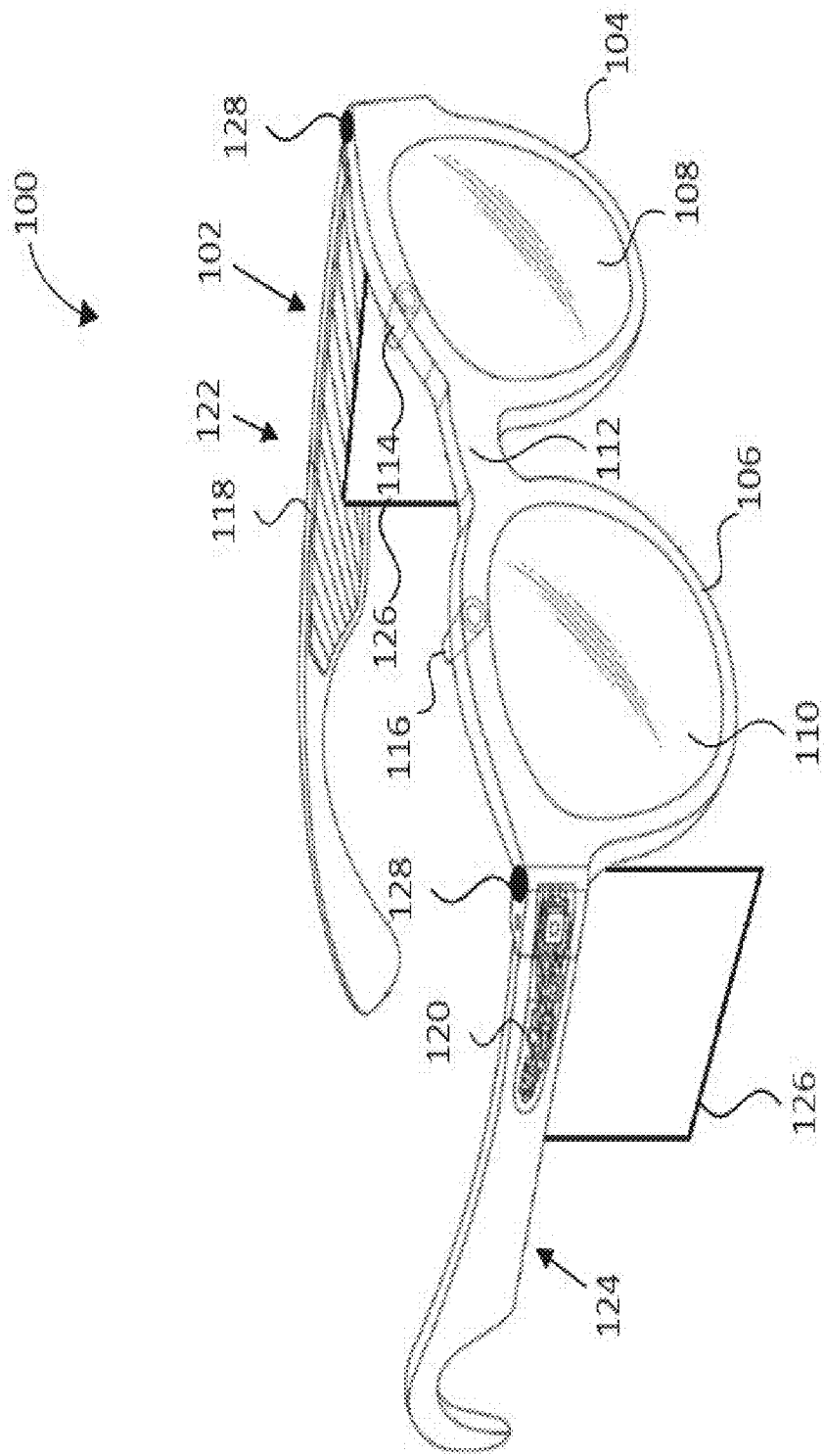
FIG. 1 is a perspective view of a head-worn device, in accordance with some examples.

Some head-worn XR devices, such as AR glasses, include a transparent or semi-transparent display that enables a user to see through the transparent or semi-transparent display to view the surrounding environment. Additional information or objects (e.g., virtual objects such as 3D renderings, images, video, text, and so forth) are shown on the display and appear as a part of, and/or overlaid upon, the surrounding environment to provide an augmented reality (AR) experience for the user. The display may for example include a waveguide that receives a light beam from a projector but any appropriate display for presenting augmented or virtual content to the wearer may be used.

As referred to herein, the phrase "augmented reality experience," includes or refers to various image processing operations corresponding to an image modification, filter, media overlay, transformation, and the like, as described further herein. In some examples, these image processing operations provide an interactive experience of a real-world environment, where objects, surfaces, backgrounds, lighting and so forth in the real world are enhanced by computer-generated perceptual information. In this context an "augmented reality effect" comprises the collection of data, parameters, and other assets used to apply a selected augmented reality experience to an image or a video feed.

In some examples, a user's interaction with software applications executing on an XR device is achieved using a 3D User Interface. The 3D user interface includes virtual objects displayed to a user by the XR device in a 3D render displayed to the user. In the case of AR, the user perceives the virtual objects as objects within the real world as viewed by the user while wearing the XR device. In the case of VR, the user perceives the virtual objects as objects within the virtual world as viewed by the user while wearing the XR device. To allow the user to interact with the virtual objects, the XR device detects the user's hand positions and movements and uses those hand positions and movements to determine the user's intentions in manipulating the virtual objects.

Generation of the 3D user interface and detection of the user's interactions with the virtual objects may also include detection of real world objects (e.g., faces, hands, bodies, cats, dogs, surfaces, objects), tracking of such real world objects as they leave, enter, and move around the field of view in video frames, and the modification or transformation of such real world objects as they are tracked. In various examples, different methods for detecting the real-world objects and achieving such transformations may be used. For example, some examples may involve generating a 3D mesh model of a real-world object or real world objects, and using transformations and animated textures of the model within the video frames to achieve the transformation. In other examples, tracking of points on a real-world object may be used to place an image or texture, which may be two dimensional or three dimensional, at the tracked position. In still further examples, neural network analysis of video frames may be used to place images, models, or textures in content (e.g., images or frames of video). XR effect data thus may include both the images, models, and textures used to create transformations in content, as well as additional modeling and analysis information used to achieve such transformations with real world object detection, tracking, and placement.

Other technical features may be readily apparent to one skilled in the art from the following figures, descriptions, and claims.

Traditional systems, particularly in the context of augmented reality (AR) and mixed reality (MR) environments, often face several deficiencies that can limit their effectiveness and user experience. Traditional systems, especially those that rely on client-server models, often encounter bottlenecks due to the limited processing power available on client devices. This can be particularly problematic in AR applications, which require real-time processing of complex data sets, including video feeds, spatial mapping, and 3D rendering.

Latency is a significant issue in traditional AR systems where data must be sent to a central server for processing and then returned to the user's device. This round-trip data flow can result in delays that disrupt the real-time interaction crucial for an immersive AR experience, leading to a lag between user actions and system responses.

Many traditional AR systems require continuous network connectivity to function effectively, as they often depend on cloud-based resources for processing and data storage. This reliance can restrict usability in areas with poor or no Internet access and can introduce additional points of failure, such as network outages or connectivity issues.

Scaling traditional AR systems to accommodate a large number of users simultaneously can be challenging. As more devices connect to the server, the increased load can lead to slower response times and decreased performance, affecting the overall user experience.

In traditional setups, sensitive data must often be transmitted over networks to centralized servers, raising concerns about data privacy and security. The risk of interception or unauthorized access to personal data, such as location or visual recordings, can be a significant concern for users.

Traditional AR systems, particularly those that rely heavily on cloud-based processing, can be inefficient in terms of energy consumption. The need to continuously communicate with remote servers not only drains the device's battery faster but also increases the overall energy demand of the system.

Traditional AR experiences might suffer from issues related to display quality, including resolution limitations, improper alignment of virtual and real-world elements, and visual lag. These issues can detract from the realism and immersion of the AR experience, making it less effective for users.

These deficiencies highlight some of the fundamental challenges that need addressing to improve the functionality, responsiveness, and user-friendliness of AR systems.

Some examples described herein may mitigate or eliminate the deficiencies of traditional systems. The AR system architecture addresses many of the deficiencies found in traditional systems through several key improvements and technological advancements.

By integrating most of the computational and processing tasks directly into the AR device, the AR system eliminates the need for continuous reliance on external servers or cloud-based processing. This decentralization allows for faster data processing and reduces the latency typically associated with sending data to and from a central server, ensuring a smoother, more responsive AR experience.

The system's architecture, where the AR device handles significant processing tasks such as feature extraction, hand tracking, and SLAM, minimizes the data transmission required between the device and any external systems. This local processing capability significantly reduces the latency that hampers traditional AR systems, enhancing real-time interactions and making the system more reactive to user inputs.

Since the AR device carries out the heavy lifting for processing and rendering, the dependency on continuous network connectivity is greatly reduced. Users can operate the AR system effectively even in environments with limited or no Internet access, broadening the usability and application areas of the technology.

The self-contained nature of the AR device, with its integrated processing and control, allows the system to scale more effectively. Each device operates independently, reducing the load on centralized resources and avoiding the performance bottlenecks experienced in traditional server-dependent AR systems when user numbers increase.

By processing sensitive data locally on the AR device and minimizing data transmission over networks, the system enhances data privacy and security. This local processing approach reduces the risk of data breaches or unauthorized access, as less sensitive information is transmitted or stored externally.

The system is designed to optimize energy usage by enabling the AR device to turn off its display or shift to lower power consumption modes when intensive processing is not required. This approach not only extends battery life but also enhances the overall energy efficiency of the device.

With advanced local processing capabilities, the AR device can tailor content rendering to the specific needs of the user and the characteristics of the viewing environment. This capability ensures that virtual objects are rendered with higher accuracy and alignment, improving the quality of the display and the realism of the AR experience. The system can dynamically adjust content based on viewer positions and interactions, further personalizing and enhancing the user experience.

Overall, this invention addresses traditional AR system deficiencies by empowering the AR device with comprehensive processing capabilities, reducing reliance on external systems, and enhancing user experience through improved responsiveness, privacy, scalability, and display quality. This shift leads to a more robust, flexible, and user-friendly AR platform.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in a AR-deprived display of AR content process. Computing resources used by one or more machines, databases, or networks may thus be more efficiently utilized or even reduced.

Headworn XR Device

FIG. 1 is perspective view of a head-worn XR device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 302 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real world scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
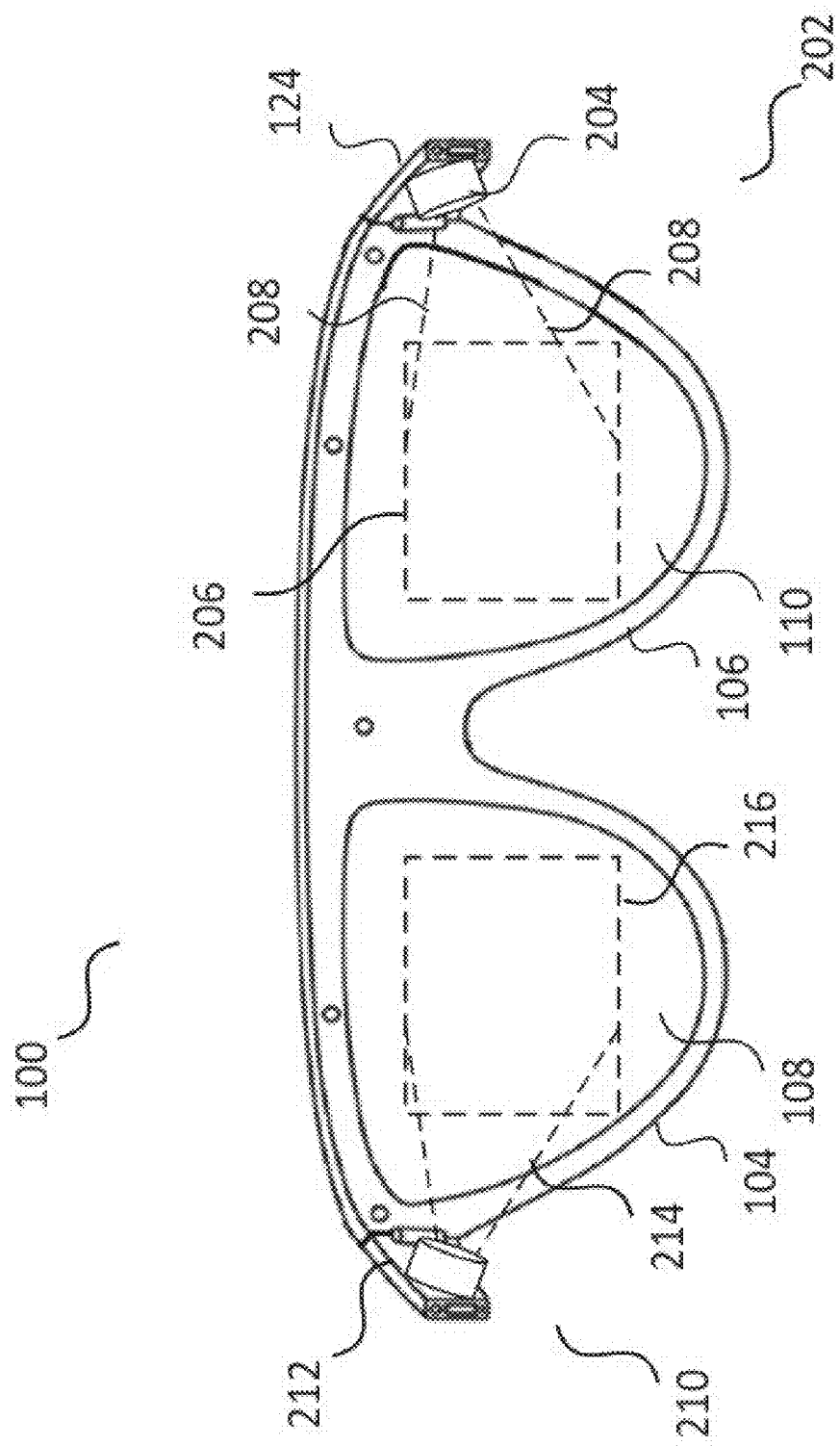
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real world seen by the user. Similarly, light 214 emitted by the projector 212 encounters the diffractive structures of the waveguide of the near eye display 216, which directs the light towards the left eye of a user to provide an image on or in the left optical element 108 that overlays the view of the real world seen by the user. The combination of a GPU, the forward optical assembly 202, the left optical element 108, and the right optical element 110 provide an optical engine of the glasses 100. The glasses 100 use the optical engine to generate an overlay of the real world view of the user including display of a 3D user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various 3D user interfaces on the near eye displays. As described in more detail herein, the user can then interact with the glasses 100 using a touchpad 126 and/or the buttons 128, voice inputs or touch inputs on an associated device (e.g. client device 328 illustrated in FIG. 3), and/or hand movements, locations, and positions detected by the glasses 100.

Figure 3:
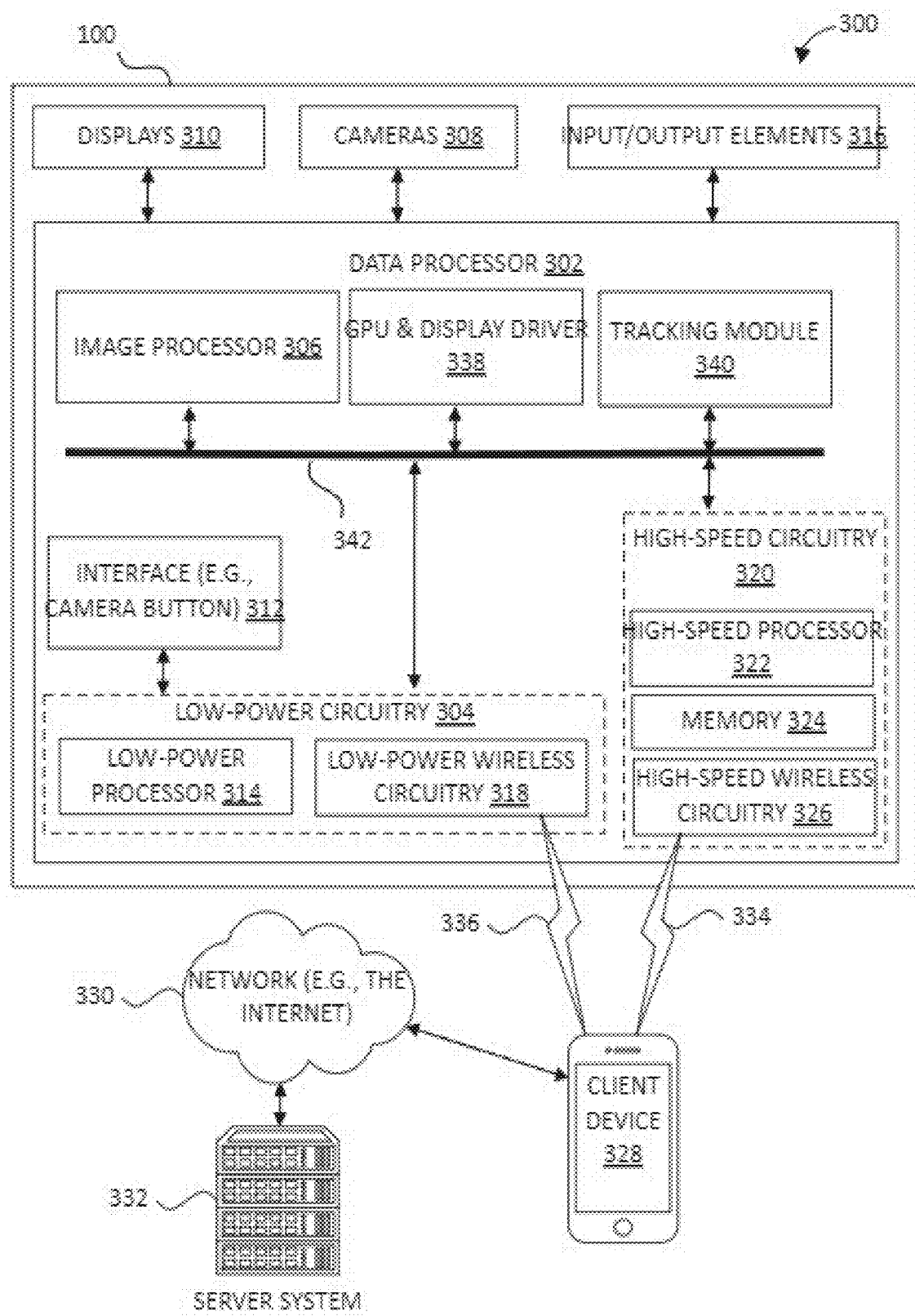
FIG. 3 is a block diagram illustrating a networked system 300 including details of the head-worn device of FIG. 1, in accordance with some examples.

FIG. 3 is a block diagram illustrating a networked system 300 including details of the glasses 100, in accordance with some examples. The networked system 300 includes the glasses 100, a client device 328, and a server system 332. The client device 328 may be a smartphone, tablet, phablet, laptop computer, access point, or any other such device capable of connecting with the glasses 100 using a low-power wireless connection 336 and/or a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture or the machine described in FIG. 5 and FIG. 14 respectively.

The glasses 100 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 5 and FIG. 14. For example, the input/output elements 316 may include any of I/O components 1406 including output components 1624, motion components 1630, and so forth. Examples of the displays 310 are discussed in FIG. 2. In the particular examples described herein, the displays 310 include a display for the user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the cameras 308. In other examples, the interface 312 may have a software component, or may be associated with a command received wirelessly from another source, such as from the client device 328.

The image processor 306 includes circuitry to receive signals from the cameras 308 and process those signals from the cameras 308 into a format suitable for storage in the memory 324 or for transmission to the client device 328. In one or more examples, the image processor 306 (e.g., video processor) comprises a microprocessor integrated circuit (IC) customized for processing sensor data from the cameras 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 100. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system used for the data processor 302. The high-speed processor 322 includes processing resources used for managing high-speed data transfers on the high-speed wireless connection 334 using the high-speed wireless circuitry 326. In some examples, the high-speed processor 322 executes an operating system such as a LINUX operating system or other such operating system. In addition to any other responsibilities, the high-speed processor 322 executing a software architecture for the data processor 302 is used to manage data transfers with the high-speed wireless circuitry 326. In some examples, the high-speed wireless circuitry 326 is configured to implement Institute of Electrical and Electronic Engineers (IEEE) 1402.11 communication standards, also referred to herein as Wi-Fi. In other examples, other high-speed communications standards may be implemented by the high-speed wireless circuitry 326.

The memory 324 includes any storage device capable of storing camera data generated by the cameras 308 and the image processor 306. While the memory 324 is shown as integrated with the high-speed circuitry 320, in other examples, the memory 324 may be an independent standalone element of the data processor 302. In some such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is desired.

The tracking module 340 estimates a pose of the glasses 100. For example, the tracking module 340 uses image data and corresponding inertial data from the cameras 308 and the position components, as well as GPS data, to track a location and determine a pose of the glasses 100 relative to a frame of reference (e.g., real-world environment). The tracking module 340 continually gathers and uses updated sensor data describing movements of the glasses 100 to determine updated three-dimensional poses of the glasses 100 that indicate changes in the relative position and orientation relative to physical objects in the real-world environment. The tracking module 340 permits visual placement of virtual objects relative to physical objects by the glasses 100 within the field of view of the user via the displays 310.

The GPU & display driver 338 may use the pose of the glasses 100 to generate frames of virtual content or other content to be presented on the displays 310 when the glasses 100 are functioning in a traditional augmented reality mode. In this mode, the GPU & display driver 338 generates updated frames of virtual content based on updated three-dimensional poses of the glasses 100, which reflect changes in the position and orientation of the user in relation to physical objects in the user's real-world environment.

One or more functions or operations described herein may also be performed in an Application resident on the glasses 100 or on the client device 328, or on a remote server. For example, one or more functions or operations described herein may be performed by one of the applications such as messaging application.

Networked Computing Environment

Figure 4:
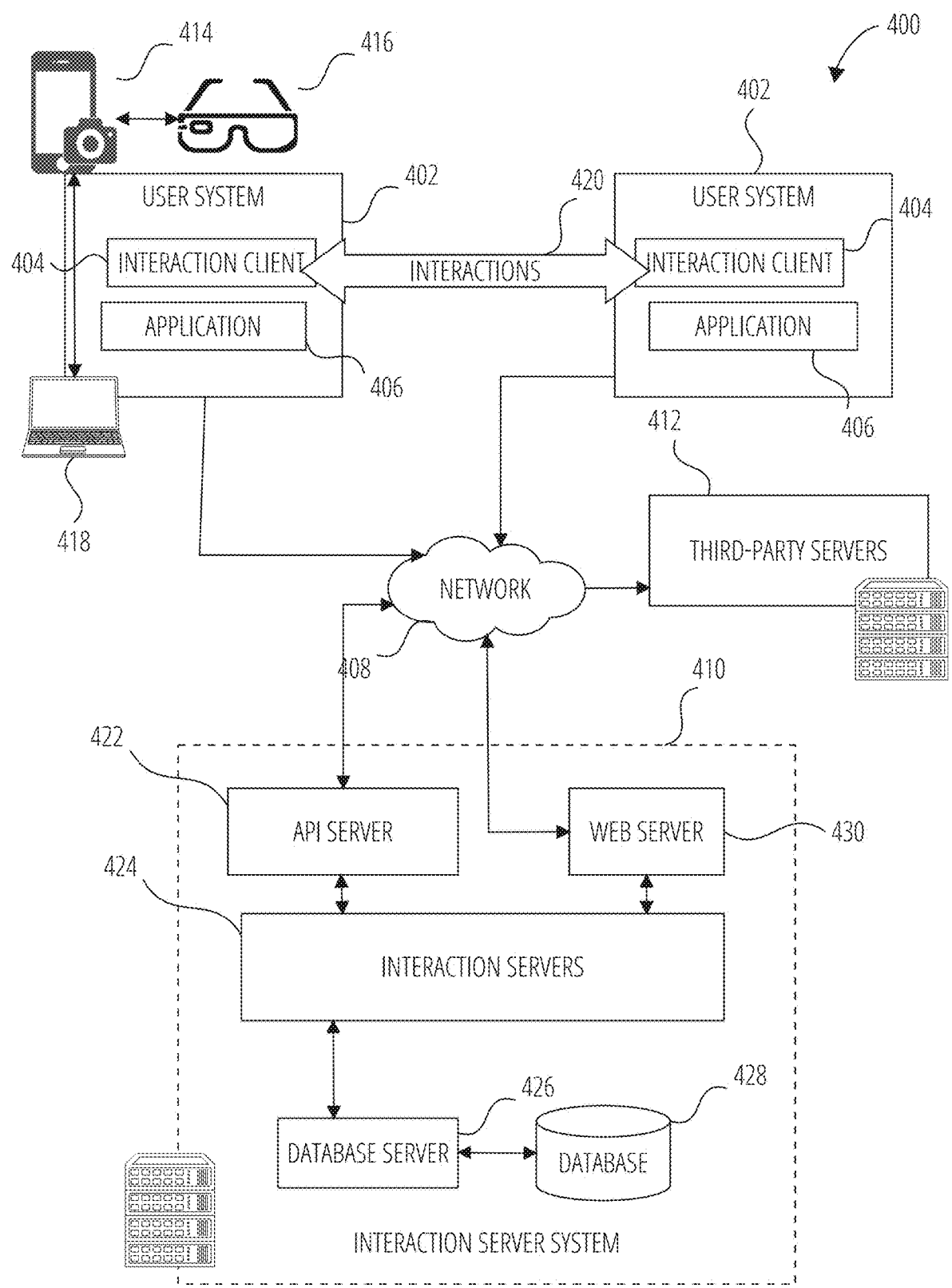
FIG. 4 is a diagrammatic representation of a networked environment in which the present disclosure may be deployed, according to some examples.

FIG. 4 is a block diagram showing an example interaction system 400 for facilitating interactions (e.g., exchanging text messages, conducting text audio and video calls, or playing games) over a network. The interaction system 400 includes multiple user systems 402, each of which hosts multiple applications, including an interaction client 404 and other applications 406. Each interaction client 404 is communicatively coupled, via one or more communication networks including a network 408 (e.g., the Internet), to other instances of the interaction client 404 (e.g., hosted on respective other user systems), an interaction server system 410 and third-party servers 412). An interaction client 404 can also communicate with locally hosted applications 406 using Applications Programming Interfaces (APIs).

Each user system 402 may include multiple user devices, such as a mobile device 414, head-wearable apparatus 416, and a computer client device 418 that are communicatively connected to exchange data and messages.

An interaction client 404 interacts with other interaction clients 404 and with the interaction server system 410 via the network 408. The data exchanged between the interaction clients 404 (e.g., interactions 420) and between the interaction clients 404 and the other interaction server system 410 includes functions (e.g., commands to invoke functions) and payload data (e.g., text, audio, video, or other multimedia data).

The interaction server system 410 provides server-side functionality via the network 408 to the interaction clients 404. While certain functions of the interaction system 400 are described herein as being performed by either an interaction client 404 or by the interaction server system 410, the location of certain functionality either within the interaction client 404 or the interaction server system 410 may be a design choice. For example, it may be technically preferable to initially deploy particular technology and functionality within the interaction server system 410 but to later migrate this technology and functionality to the interaction client 404 where a user system 402 has sufficient processing capacity.

The interaction server system 410 supports various services and operations that are provided to the interaction clients 404. Such operations include transmitting data to, receiving data from, and processing data generated by the interaction clients 404. This data may include message content, client device information, geolocation information, media augmentation and overlays, message content persistence conditions, entity relationship information, and live event information. Data exchanges within the interaction system 400 are invoked and controlled through functions available via user interfaces (UIs) of the interaction clients 404.

Turning now specifically to the interaction server system 410, an API server 422 is coupled to and provides programmatic interfaces to interaction servers 424, making the functions of the interaction servers 424 accessible to interaction clients 404, other applications 406 and third-party server 412. The interaction servers 424 are communicatively coupled to a database server 426, facilitating access to a database 428 that stores data associated with interactions processed by the interaction servers 424. Similarly, a web server 430 is coupled to the interaction servers 424 and provides web-based interfaces to the interaction servers 424. To this end, the web server 430 processes incoming network requests over the Hypertext Transfer Protocol (HTTP) and several other related protocols.

The API server receives and transmits interaction data (e.g., commands and message payloads) between the interaction servers 424 and the user systems 402 (and, for example, interaction clients 404 and other application 406) and the third-party server 412. Specifically, the API server provides a set of interfaces (e.g., routines and protocols) that can be called or queried by the interaction client 404 and other applications 406 to invoke functionality of the interaction servers 424. The API server exposes various functions supported by the interaction servers 424, including account registration; login functionality; the sending of interaction data, via the interaction servers 424, from a particular interaction client 404 to another interaction client 404; the communication of media files (e.g., images or video) from an interaction client 404 to the interaction servers 424; the settings of a collection of media data (e.g., a story); the retrieval of a list of friends of a user of a user system 402; the retrieval of messages and content; the addition and deletion of entities (e.g., friends) to an entity relationship graph (e.g., the entity graph 610); the location of friends within an entity relationship graph; and opening an application event (e.g., relating to the interaction client 404).

The interaction servers 424 hosts multiple systems and subsystems, described below with reference to FIG. 5.

Linked Applications

Returning to the interaction client 404, features and functions of an external resource (e.g., a linked application 406 or applet) are made available to a user via an interface of the interaction client 404. In this context, "external" refers to the fact that the application 406 or applet is external to the interaction client 404. The external resource is often provided by a third party but may also be provided by the creator or provider of the interaction client 404. The interaction client 404 receives a user selection of an option to launch or access features of such an external resource. The external resource may be the application 406 installed on the user system 402 (e.g., a "native app"), or a small-scale version of the application (e.g., an "applet") that is hosted on the user system 402 or remote of the user system 402 (e.g., on third-party servers 412). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 404. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 404 determines whether the selected external resource is a web-based external resource or a locally installed application 406. In some cases, applications 406 that are locally installed on the user system 402 can be launched independently of and separately from the interaction client 404, such as by selecting an icon corresponding to the application 406 on a home screen of the user system 402. Small-scale versions of such applications can be launched or accessed via the interaction client 404 and, in some examples, no or limited portions of the small-scale application can be accessed outside of the interaction client 404. The small-scale application can be launched by the interaction client 404 receiving, from third-party servers 412 for example, a markup-language document associated with the small-scale application and processing such a document.

In response to determining that the external resource is a locally installed application 406, the interaction client 404 instructs the user system 402 to launch the external resource by executing locally stored code corresponding to the external resource. In response to determining that the external resource is a web-based resource, the interaction client 404 communicates with the third-party servers 412 (for example) to obtain a markup-language document corresponding to the selected external resource. The interaction client 404 then processes the obtained markup-language document to present the web-based external resource within a user interface of the interaction client 404.

The interaction client 404 can notify a user of the user system 402, or other users related to such a user (e.g., "friends"), of activity taking place in one or more external resources. For example, the interaction client 404 can provide participants in a conversation (e.g., a chat session) in the interaction client 404 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 404, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 404. The external resource can selectively include different media items in the responses, based on a current context of the external resource.

The interaction client 404 can present a list of the available external resources (e.g., applications 406 or applets) to a user to launch or access a given external resource. This list can be presented in a context-sensitive menu. For example, the icons representing different applications 406 (or applets) can vary based on how the menu is launched by the user (e.g., from a conversation interface or from a non-conversation interface).

System Architecture

Figure 5:
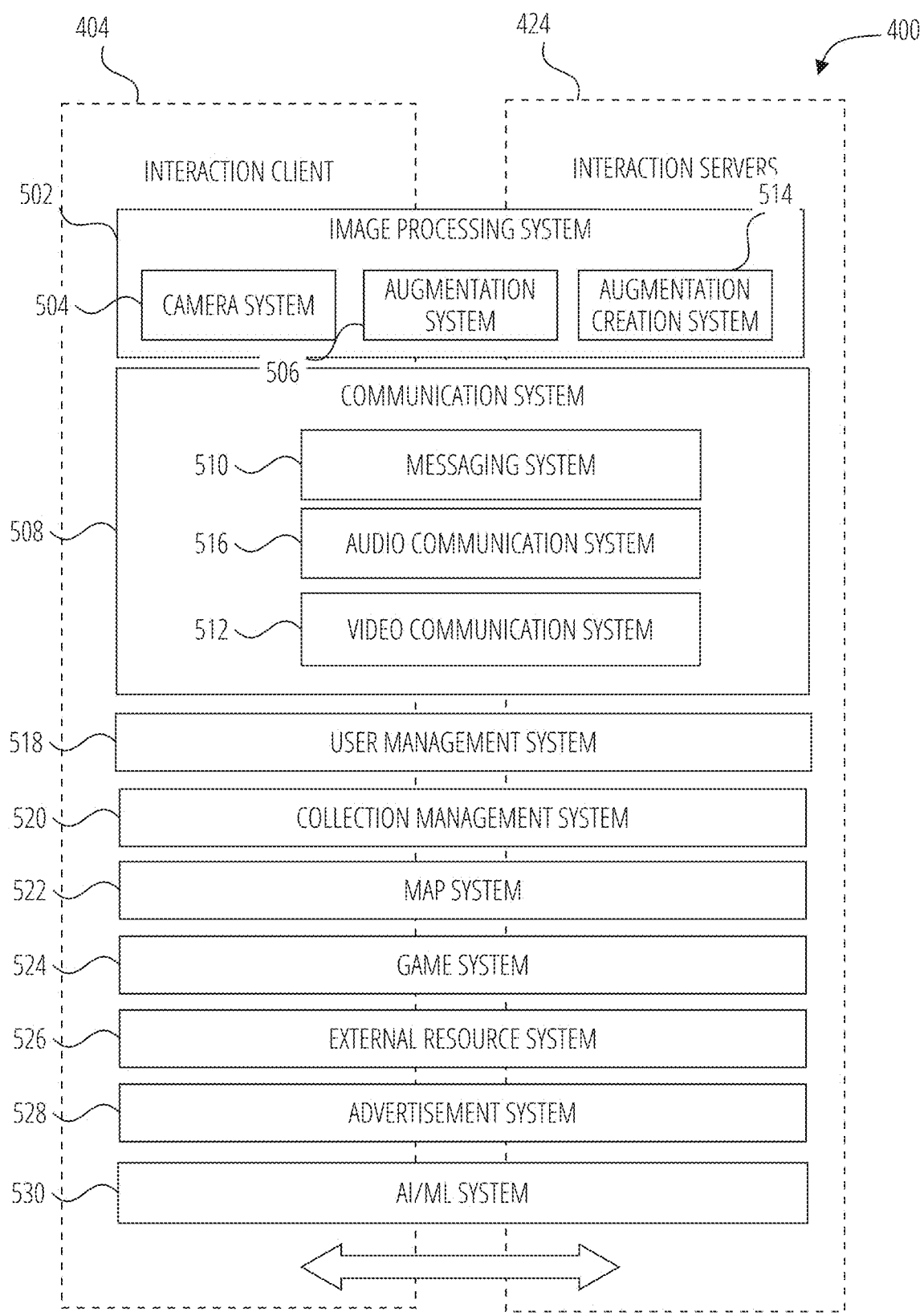
FIG. 5 is a diagrammatic representation of an interaction system that has both client-side and server-side functionality, according to some examples.

FIG. 5 is a block diagram illustrating further details regarding the interaction system 400, according to some examples. Specifically, the interaction system 400 is shown to comprise the interaction client 404 and the interaction servers 424. The interaction system 400 embodies multiple subsystems, which are supported on the client-side by the interaction client 404 and on the server-side by the interaction servers 424. In some examples, these subsystems are implemented as microservices. A microservice subsystem (e.g., a microservice application) may have components that enable it to operate independently and communicate with other services. Example components of a microservice subsystem may include:

Function logic: The function logic implements the functionality of the microservice subsystem, representing a specific capability or function that the microservice provides.

API interface: Microservices may communicate with other component through well-defined APIs or interfaces, using lightweight protocols such as REST or messaging. The API interface defines the inputs and outputs of the microservice subsystem and how it interacts with other microservice subsystems of the interaction system 400.

Data storage: A microservice subsystem may be responsible for its own data storage, which may be in the form of a database, cache, or other storage mechanism (e.g., using the database server 426 and database 428). This enables a microservice subsystem to operate independently of other microservices of the interaction system 400.

Service discovery: Microservice subsystems may find and communicate with other microservice subsystems of the interaction system 400. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 400 may employ a monolithic architecture, a service-oriented architecture (SOA), a function-as-a-service (FaaS) architecture, or a modular architecture:

Example subsystems are discussed below.

An image processing system 502 provides various functions that enable a user to capture and augment (e.g., annotate or otherwise modify or edit) media content associated with a message.

A camera system 504 includes control software (e.g., in a camera application) that interacts with and controls camera hardware (e.g., directly or via operating system controls) of the user system 402 to modify and augment real-time images captured and displayed via the interaction client 404.

The augmentation system 506 provides functions related to the generation and publishing of augmentations (e.g., media overlays) for images captured in real-time by cameras of the user system 402 or retrieved from memory of the user system 402. For example, the augmentation system 506 operatively selects, presents, and displays media overlays (e.g., an image filter or an image lens) to the interaction client 404 for the augmentation of real-time images received via the camera system 504 or stored images retrieved from memory 1502 of a user system 402. These augmentations are selected by the augmentation system 506 and presented to a user of an interaction client 404, based on a number of inputs and data, such as for example:

Geolocation of the user system 402; and

Entity relationship information of the user of the user system 402.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 402 for communication in a message, or applied to video content, such as a video content stream or feed transmitted from an interaction client 404. As such, the image processing system 502 may interact with, and support, the various subsystems of the communication system 508, such as the messaging system 510 and the video communication system 512.

A media overlay may include text or image data that can be overlaid on top of a photograph taken by the user system 402 or a video stream produced by the user system 402. In some examples, the media overlay may be a location overlay (e.g., Venice beach), a name of a live event, or a name of a merchant overlay (e.g., Beach Coffee House). In further examples, the image processing system 502 uses the geolocation of the user system 402 to identify a media overlay that includes the name of a merchant at the geolocation of the user system 402. The media overlay may include other indicia associated with the merchant. The media overlays may be stored in the databases 428 and accessed through the database server 426.

The image processing system 502 provides a user-based publication platform that enables users to select a geolocation on a map and upload content associated with the selected geolocation. The user may also specify circumstances under which a particular media overlay should be offered to other users. The image processing system 502 generates a media overlay that includes the uploaded content and associates the uploaded content with the selected geolocation.

The augmentation creation system 514 supports augmented reality developer platforms and includes an application for content creators (e.g., artists and developers) to create and publish augmentations (e.g., augmented reality experiences) of the interaction client 404. The augmentation creation system 514 provides a library of built-in features and tools to content creators including, for example custom shaders, tracking technology, and templates.

In some examples, the augmentation creation system 514 provides a merchant-based publication platform that enables merchants to select a particular augmentation associated with a geolocation via a bidding process. For example, the augmentation creation system 514 associates a media overlay of the highest bidding merchant with a corresponding geolocation for a predefined amount of time.

A communication system 508 is responsible for enabling and processing multiple forms of communication and interaction within the interaction system 400 and includes a messaging system 510, an audio communication system 516, and a video communication system 512. The messaging system 510 is responsible for enforcing the temporary or time-limited access to content by the interaction clients 404. The messaging system 510 incorporates multiple timers (e.g., within an ephemeral timer system) that, based on duration and display parameters associated with a message or collection of messages (e.g., a story), selectively enable access (e.g., for presentation and display) to messages and associated content via the interaction client 404. The audio communication system 516 enables and supports audio communications (e.g., real-time audio chat) between multiple interaction clients 404. Similarly, the video communication system 512 enables and supports video communications (e.g., real-time video chat) between multiple interaction clients 404.

A user management system 518 is operationally responsible for the management of user data and profiles, and maintains entity information (e.g., stored in entity tables 608, entity graphs 610 and profile data 602) regarding users and relationships between users of the interaction system 400.

A collection management system 520 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 520 may also be responsible for publishing an icon that provides notification of a particular collection to the user interface of the interaction client 404. The collection management system 520 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 520 employs machine vision (or image recognition technology) and content rules to curate a content collection automatically. In certain examples, compensation may be paid to a user to include user-generated content into a collection. In such cases, the collection management system 520 operates to automatically make payments to such users to use their content.

A map system 522 provides various geographic location (e.g., geolocation) functions and supports the presentation of map-based media content and messages by the interaction client 404. For example, the map system 522 enables the display of user icons or avatars (e.g., stored in profile data 602) on a map to indicate a current or past location of "friends" of a user, as well as media content (e.g., collections of messages including photographs and videos) generated by such friends, within the context of a map. For example, a message posted by a user to the interaction system 400 from a specific geographic location may be displayed within the context of a map at that particular location to "friends" of a specific user on a map interface of the interaction client 404. A user can furthermore share his or her location and status information (e.g., using an appropriate status avatar) with other users of the interaction system 400 via the interaction client 404, with this location and status information being similarly displayed within the context of a map interface of the interaction client 404 to selected users.

A game system 524 provides various gaming functions within the context of the interaction client 404. The interaction client 404 provides a game interface providing a list of available games that can be launched by a user within the context of the interaction client 404 and played with other users of the interaction system 400. The interaction system 400 further enables a particular user to invite other users to participate in the play of a specific game by issuing invitations to such other users from the interaction client 404. The interaction client 404 also supports audio, video, and text messaging (e.g., chats) within the context of gameplay, provides a leaderboard for the games, and also supports the provision of in-game rewards (e.g., coins and items).

An external resource system 526 provides an interface for the interaction client 404 to communicate with remote servers (e.g., third-party servers 412) to launch or access external resources, i.e., applications or applets. Each third-party server 412 hosts, for example, a markup language (e.g., HTML5) based application or a small-scale version of an application (e.g., game, utility, payment, or ride-sharing application). The interaction client 404 may launch a web-based resource (e.g., application) by accessing the HTML5 file from the third-party servers 412 associated with the web-based resource. Applications hosted by third-party servers 412 are programmed in JavaScript leveraging a Software Development Kit (SDK) provided by the interaction servers 424. The SDK includes APIs with functions that can be called or invoked by the web-based application. The interaction servers 424 hosts a JavaScript library that provides a given external resource access to specific user data of the interaction client 404. HTML5 is an example of technology for programming games, but applications and resources programmed based on other technologies can be used.

To integrate the functions of the SDK into the web-based resource, the SDK is downloaded by the third-party server 412 from the interaction servers 424 or is otherwise received by the third-party server 412. Once downloaded or received, the SDK is included as part of the application code of a web-based external resource. The code of the web-based resource can then call or invoke certain functions of the SDK to integrate features of the interaction client 404 into the web-based resource.

The SDK stored on the interaction server system 410 effectively provides the bridge between an external resource (e.g., applications 406 or applets) and the interaction client 404. This gives the user a seamless experience of communicating with other users on the interaction client 404 while also preserving the look and feel of the interaction client 404. To bridge communications between an external resource and an interaction client 404, the SDK facilitates communication between third-party servers 412 and the interaction client 404. A bridge script running on a user system 402 establishes two one-way communication channels between an external resource and the interaction client 404. Messages are sent between the external resource and the interaction client 404 via these communication channels asynchronously. Each SDK function invocation is sent as a message and callback. Each SDK function is implemented by constructing a unique callback identifier and sending a message with that callback identifier.

By using the SDK, not all information from the interaction client 404 is shared with third-party servers 412. The SDK limits which information is shared based on the needs of the external resource. Each third-party server 412 provides an HTML5 file corresponding to the web-based external resource to interaction servers 424. The interaction servers 424 can add a visual representation (such as a box art or other graphic) of the web-based external resource in the interaction client 404. Once the user selects the visual representation or instructs the interaction client 404 through a graphical user interface (GUI) of the interaction client 404 to access features of the web-based external resource, the interaction client 404 obtains the HTML5 file and instantiates the resources to access the features of the web-based external resource.

The interaction client 404 presents a graphical user interface (e.g., a landing page or title screen) for an external resource. During, before, or after presenting the landing page or title screen, the interaction client 404 determines whether the launched external resource has been previously authorized to access user data of the interaction client 404. In response to determining that the launched external resource has been previously authorized to access user data of the interaction client 404, the interaction client 404 presents another graphical user interface of the external resource that includes functions and features of the external resource. In response to determining that the launched external resource has not been previously authorized to access user data of the interaction client 404, after a threshold period of time (e.g., 3 seconds) of displaying the landing page or title screen of the external resource, the interaction client 404 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 404 adds the external resource to a list of authorized external resources and allows the external resource to access user data from the interaction client 404. The external resource is authorized by the interaction client 404 to access the user data under an OAuth 2 framework.

The interaction client 404 controls the type of user data that is shared with external resources based on the type of external resource being authorized. For example, external resources that include full-scale applications (e.g., an application 406) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 528 operationally enables the purchasing of advertisements by third parties for presentation to end-users via the interaction clients 404 and also handles the delivery and presentation of these advertisements.

Data Architecture

Figure 6:
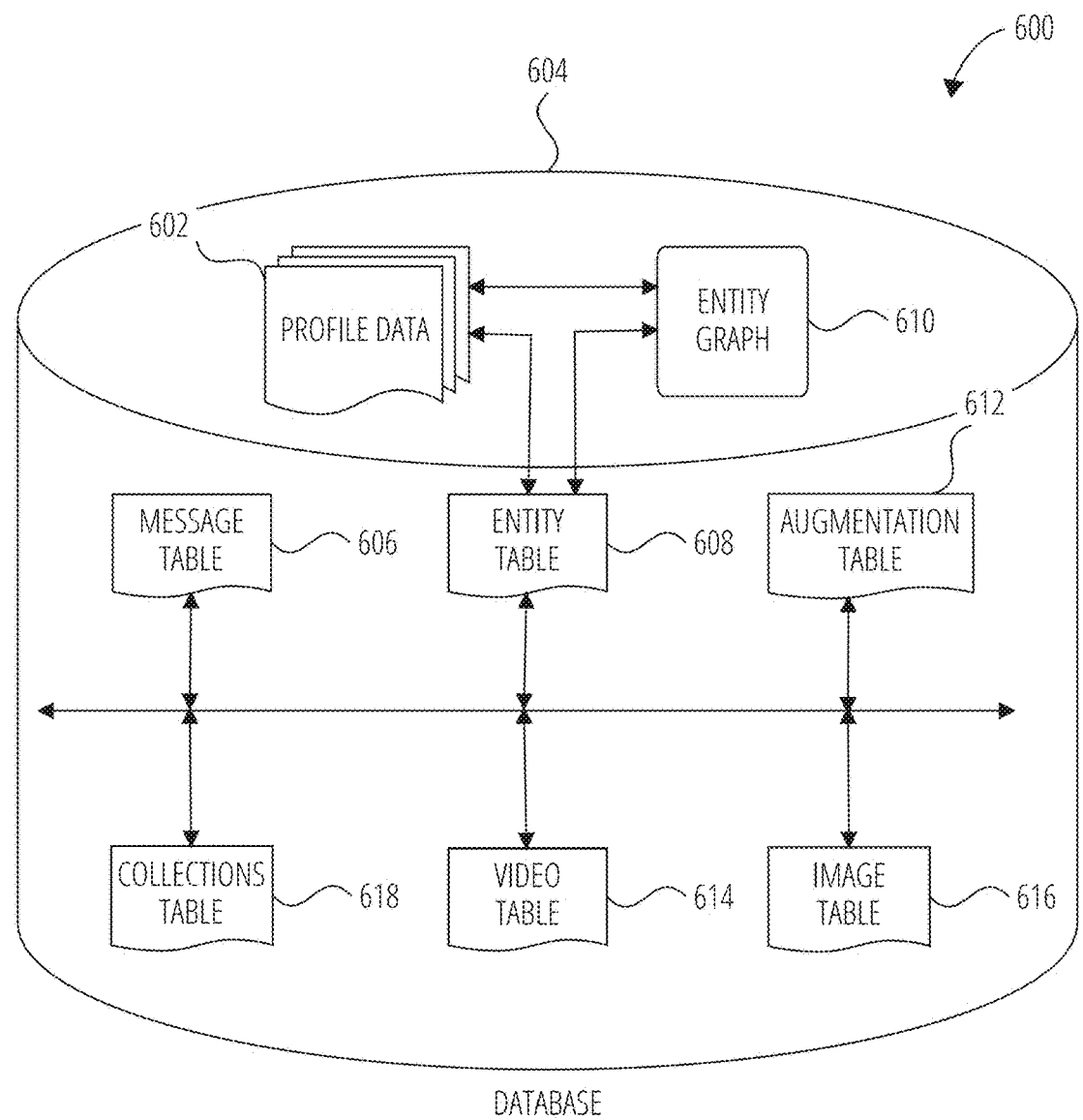
FIG. 6 is a diagrammatic representation of a data structure as maintained in a database, according to some examples.

FIG. 6 is a schematic diagram illustrating data structures 600, which may be stored in the database 604 of the interaction server system 410, according to certain examples. While the content of the database 604 is shown to comprise multiple tables, it will be appreciated that the data could be stored in other types of data structures (e.g., as an object-oriented database). In some cases, the database 604 includes features of or corresponds to database 428 in FIG. 4, and/or vice versa.

The database 604 includes message data stored within a message table 606. This message data includes, for any particular message, at least message sender data, message recipient (or receiver) data, and a payload. Further details regarding information that may be included in a message and included within the message data stored in the message table 606, are described below with reference to FIG. 6.

An entity table 608 stores entity data, and is linked (e.g., referentially) to an entity graph 610 and profile data 602. Entities for which records are maintained within the entity table 608 may include individuals, corporate entities, organizations, objects, places, events, and so forth. Regardless of entity type, any entity regarding which the interaction server system 410 stores data may be a recognized entity. Each entity is provided with a unique identifier, as well as an entity type identifier (not shown).

The entity graph 610 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 400. A friend relationship can be established by mutual agreement between two entities. This mutual agreement may be established by an offer from a first entity to a second entity to establish a friend relationship, and acceptance by the second entity of the offer for establishment of the friend relationship.

Where the entity is a group, the profile data 602 for the group may similarly include one or more avatar representations associated with the group, in addition to the group name, members, and various settings (e.g., notifications) for the relevant group.

The database 604 also stores augmentation data, such as overlays or filters, in an augmentation table 612. The augmentation data is associated with and applied to videos (for which data is stored in a video table 614) and images (for which data is stored in an image table 616).

Filters, in some examples, are overlays that are displayed as overlaid on an image or video during presentation to a recipient user. Filters may be of various types, including user-selected filters from a set of filters presented to a sending user by the interaction client 404 when the sending user is composing a message. Other types of filters include geolocation filters (also known as geo-filters), which may be presented to a sending user based on geographic location. For example, geolocation filters specific to a neighborhood or special location may be presented within a user interface by the interaction client 404, based on geolocation information determined by a Global Positioning System (GPS) unit of the user system 402.

Another type of filter is a data filter, which may be selectively presented to a sending user by the interaction client 404 based on other inputs or information gathered by the user system 402 during the message creation process. Examples of data filters include current temperature at a specific location, a current speed at which a sending user is traveling, battery life for a user system 402, or the current time.

Other augmentation data that may be stored within the image table 616 includes augmented reality content items (e.g., corresponding to applying "lenses" or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of the user system 402 and then displayed on a screen of the user system 402 with the modifications. This also includes modifications to stored content, such as video clips in a collection or group that may be modified. For example, in a user system 402 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 402 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated. Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation. In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

The system can capture an image or video stream on a client device (e.g., the user system 402) and perform complex image manipulations locally on the user system 402 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 402.

In some examples, the system operating within the interaction client 404 determines the presence of a face within the image or video stream and provides modification icons associated with a computer animation model to transform image data, or the computer animation model can be present as associated with an interface described herein. The system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

A collections table 618 stores data regarding collections of messages and associated image, video, or audio data, which are compiled into a collection (e.g., a story or a gallery). The creation of a particular collection may be initiated by a particular user (e.g., each user for which a record is maintained in the entity table 608). A user may create a "personal story" in the form of a collection of content that has been created and sent/broadcast by that user. To this end, the user interface of the interaction client 404 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 404, to contribute content to a particular live story. The live story may be identified to the user by the interaction client 404, based on his or her location. The end result is a "live story" told from a community perspective.

A further type of content collection is known as a "location story," which enables a user whose user system 402 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 614 stores video data that, in some examples, is associated with messages for which records are maintained within the message table 606. Similarly, the image table 616 stores image data associated with messages for which message data is stored in the entity table 608. The entity table 608 may associate various augmentations from the augmentation table 612 with various images and videos stored in the image table 616 and the video table 614.

AR Content Sharing with an External Display

Figure 7:
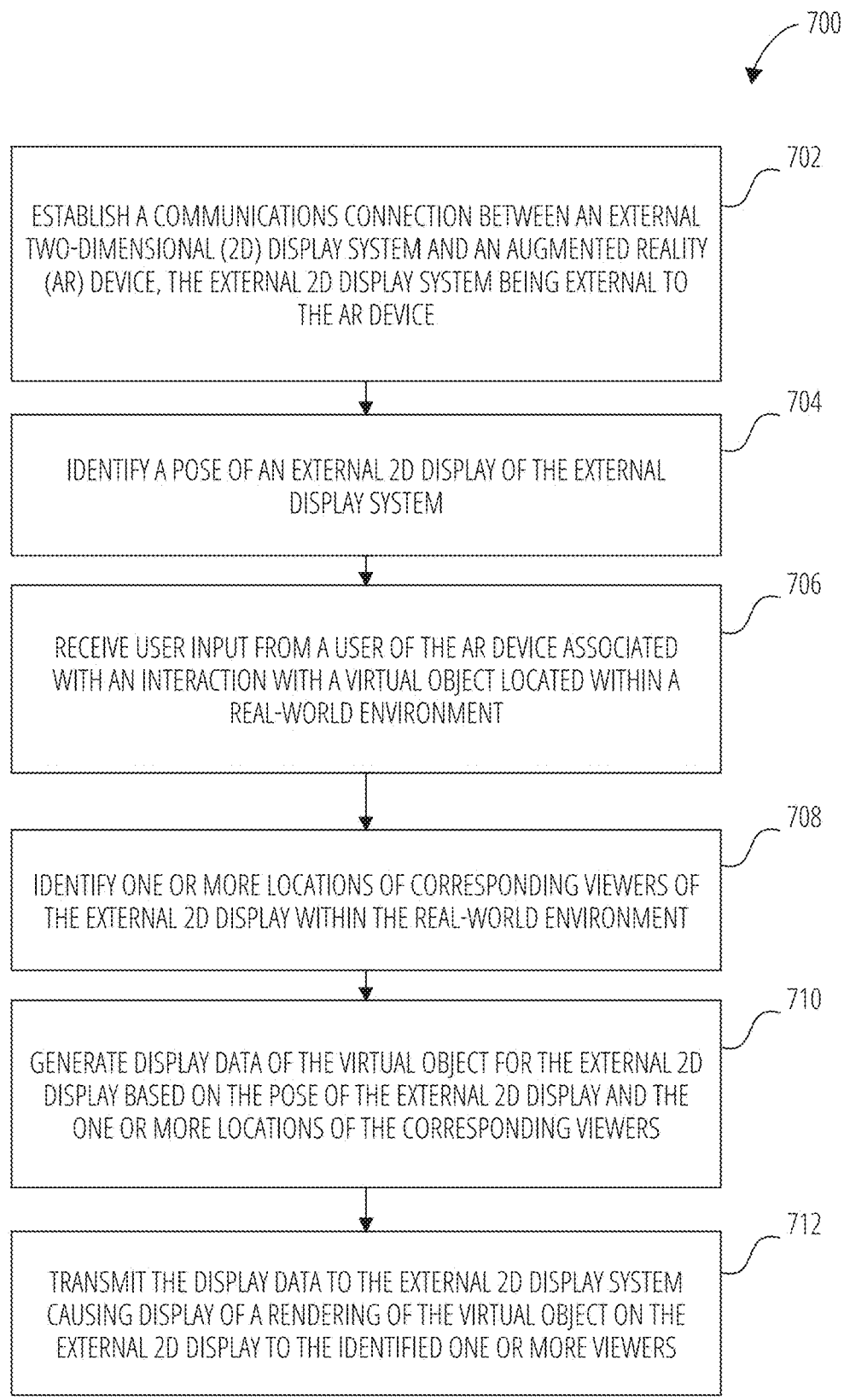
FIG. 7 illustrates an example method for AR content sharing with an AR-deprived audience, according to some examples.

FIG. 7 illustrates an example method 700 for AR content sharing with an AR-deprived audience, according to some examples. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

Extended Reality (XR) can include an umbrella term encapsulating Augmented Reality (AR), Virtual Reality (VR), Mixed Reality (MR), and everything in between. For the sake of simplicity, examples are described using one type of system, such as XR or AR. However, it is appreciated that other types of systems apply.

The examples herein are described as being performed by certain systems or applying certain processes, such as a particular machine learning model or computer vision model, but the processes described herein can be performed by one or more other or the same machine learning models, computer vision models, or a combination thereof.

At operation 702, the interaction system establishes a communications connection between an external two-dimensional (2D) display system and an augmented reality (AR) device, the external 2D display system being external to the AR device. In some cases, the interaction system selects a communication protocol for the communication connection, such as HDMI, USB, or wireless technologies such as Wi-Fi, Bluetooth, or the like. In some cases, the display system is a stereoscopic display, an autostereoscopic display, a curved display, and/or the like. However for the sake of brevity, examples described herein refer to one type of display.

The AR device discovers the external 2D display system. In some cases, the AR device discovers the external 2D display system automatically (such as via a UPnP or zero-configuration networking) or manually where the user selects the external 2D display system from a list (e.g., from a list of available Bluetooth devices).

Once the devices recognize each other, the AR device initiates a connection request to the external display system, and/or vice versa, which must be accepted for the connection communication to proceed.

Figure 8:
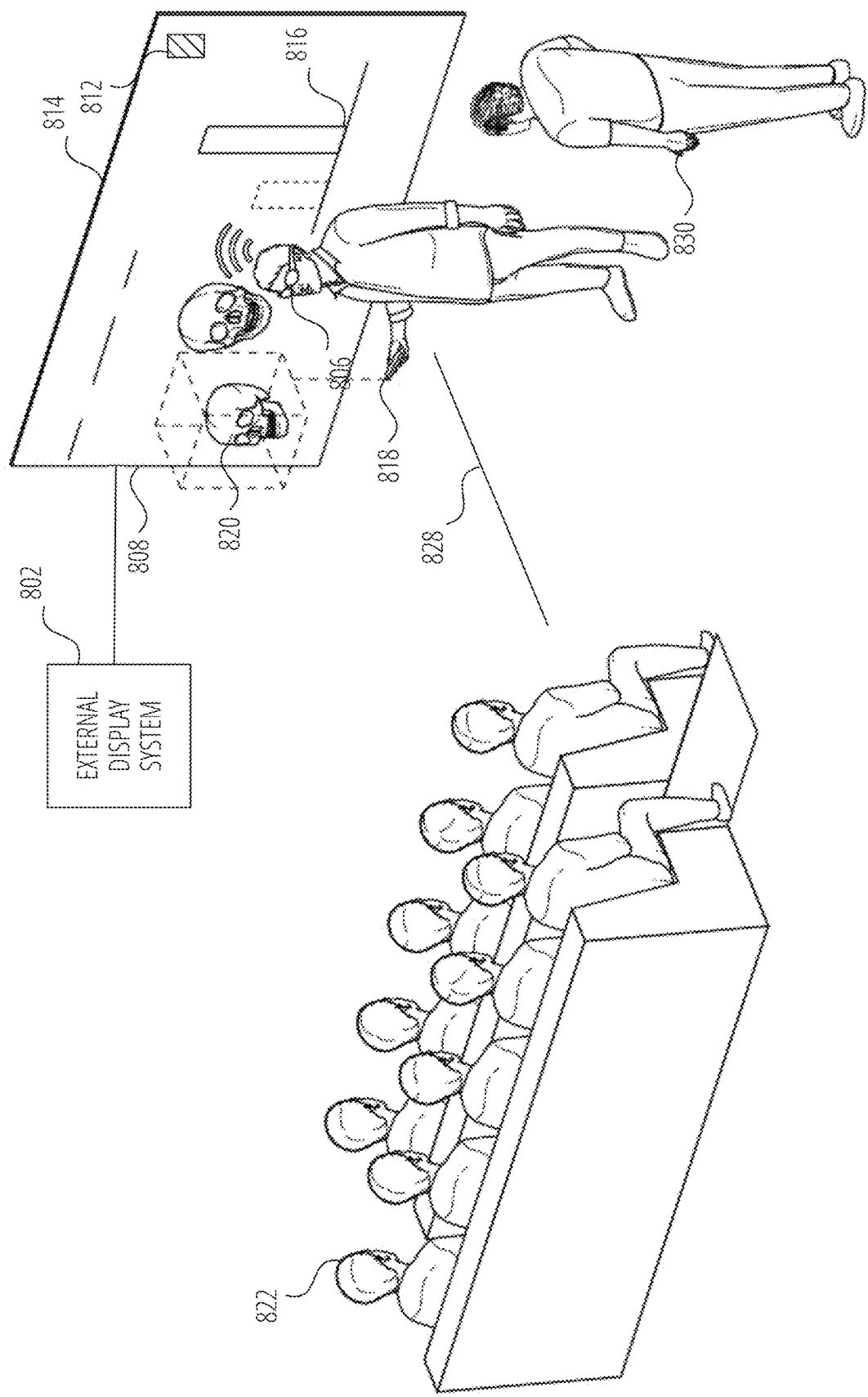
FIG. 8 illustrates sharing of AR content on a 2D display to an audience, according to some examples.

FIG. 8 illustrates sharing of AR content on a 2D display to an audience, according to some examples. The AR device 806 can establish a communication connection with the external display system 802 in order to cause display of 2D content on a 2D display or screen 808.

At operation 704, the interaction system identifies a pose of an external 2D display of the external display system. In some cases, pose data includes data corresponding to the spatial configuration of the 2D display in terms of its location (position) and the direction the 2D display faces (orientation). The pose data can include position data such as the x, y, and z coordinates of the display within a certain frame of reference and/or orientation data corresponding to an angle at which the display is tilted (pitch), turned (yaw), and rotated (roll).

In some cases, the interaction system identifies one or more other characteristics of the 2D display. Such other characteristics can also be applied to generate the display of the virtual object for the external 2D display. In some cases, the interaction system identifies a curvature characteristic for a curved display. In some cases, the interaction system identifies a shape (e.g., a trapezoidal shape) of a display for an ill-tuned projection system (e.g., a projector or display not properly calibrated).

In some cases, the interaction system identifies a scale and/or size of the 2D display, that can include the physical dimensions of the display (width, height, and possibly depth). The interaction system can apply such scale or size of the display to determine sizing the AR content appropriately, ensuring that elements are not too large or too small relative to the display and the surrounding environment.

In some cases, the interaction system identifies a field of view of a display which includes the extent of the observable world that is seen at any given moment. For example, the field of view for the 2D display can include the visible area of the screen from a particular viewing angle. The interaction system can use the field of view to determine how much content can be displayed without appearing to spill over the boundaries of the screen.

In some cases, the interaction system identifies a curvature of the 2D display that can include the degree to which the display deviates from a flat surface, describing the arc of curved monitors or screens. The interaction system can apply the curvature information to correctly render AR elements so that they appear naturally integrated onto the curved surface rather than appearing distorted.

In some cases, the interaction system identifies a resolution of the 2D display that can include a number of pixels on the display screen, which can be described in terms of width x height (e.g., 1920×1080). The interaction system can apply the resolution data for rendering detailed AR content that matches the clarity and detail level of the display, providing a visually coherent experience.

In some cases, the interaction system identifies a refresh rate, which can include a number of times in a second that a display updates its image, which can be measured in hertz (Hz). The interaction system can apply refresh rate to how smoothly motion appears. Syncing the AR content's update rate with the display's refresh rate can prevent visual artifacts like tearing or stuttering.

In some cases, the interaction system identifies a color depth which indicates how many colors a display can render, typically given in bits (e.g., 8-bit, 10-bit). The interaction system can use the color depth to match the color intensity and gradients of the AR content with those of the display, ensuring color consistency and realism.

In some cases, the interaction system identifies a brightness and/or contrast of the 2D display, which measures how bright a screen can get and the range between its lightest and darkest displayable tones, respectively. The interaction system can match the brightness and contrast settings of the AR content with those of the display to ensure that the virtual elements are neither too dim nor overly bright, maintaining visual comfort and effectiveness.

The AR device and the 2D display engage in a handshake procedure to confirm compatibility and establish a secure connection. Once this connection is active, the 2D display system can transmit information to the AR device, such as positional and orientation data. The 2D display can transmit other relevant metrics such as scale or curvature (as disclosed further herein).

Upon receiving this pose data, the AR device processes such data using its onboard systems such as internal sensors' data from gyroscopes, accelerometers, or additional cameras, to accurately understand the relative positioning of the 2D display within its own spatial framework.

The integration of received pose information (and/or other 2D display information) from a 2D display with the data from an AR device's internal sensors for data fusion and spatial computation helps to achieve accurate and immersive augmented reality experiences.

When an AR device receives pose information from a 2D display (which can include position coordinates and orientation angles), the AR device also continuously gathers data from its own suite of internal sensors. Some examples of such internal sensors include gyroscopes that measure the orientation and angular velocity of the AR device, helping to track rotations and tilts, accelerometers that detect changes in velocity along the x, y, and z axes, providing data on how the device is moving in space, and cameras that capture real-time images of the device's surroundings, which can be used to detect and recognize environmental features, including the position and orientation of external objects like the 2D display.

The AR device performs integration of such data from these various sources to create an understanding of the device's and the display's relative spatial positions. The AR device synchronizes the data to align data streams from different sensors to ensure that all measurements correspond to the same time points.

The AR device performs pose estimation such as Kalman filtering or SLAM (Simultaneous Localization and Mapping), to estimate the device's pose by combining the accelerometer and gyroscope data (for motion tracking) with visual data from the camera (for position relative to known markers or features).

Once the AR device understands its position relative to the 2D display, the AR device can accurately project virtual content onto or around the AR display and/or the 2D display. The AR device transforms the virtual objects according to the combined pose data to ensure that the virtual objects appear correctly aligned and oriented with respect to the viewer's perspective.

This integration ensures that the virtual content that appears on the AR device is coherently blended with the physical world as seen through the device. For example, if an AR application displays digital annotations on a 2D display, the annotations will appear to be fixed to specific points on the display regardless of the viewer's movement or changes in the display's position.

The AR device can capture images or videos to identify markers in order to gather data from an external 2D display. In some cases, the cameras on the AR device have a large field of view, allowing the device to capture comprehensive images of the user's environment. The cameras can include capability for high-resolution imaging for detecting small or detailed markers that might be placed on or near the external display.

In some cases, the AR device identifies a predefined visual marker, such as QR or AR codes. These markers can include high contrast and/or distinct geometric patterns, making the markers easily recognizable by image processing algorithms. In some cases, the AR device identifies custom markers that are designed to blend with the aesthetic of the setting or the display itself while still being detectable by the system.

The AR device can process the captured images to detect these markers, such as by applying computer vision techniques (e.g., edge detection, pattern recognition, and shape analysis). Once a marker is detected, the AR device decodes any information (such as positional data or identifiers) from the markers. In some cases, the markers can store a wide range of data, such as on QR codes.

Using the locations of the markers in the camera images, the AR system employs geometric transformations to map these 2D points into 3D space. The AR device can perform a Perspective-n-Point (PnP) problem-solving approach, which computes the 3D pose of an object (in this case, the external 2D display) from its 2D image points.

The pose data (position and orientation) of the display, derived from the markers, is calibrated with the internal data of the AR device which ensures that any virtual content rendered on or around the display aligns correctly in 3D space relative to the user's view. As the user or the display moves, the camera continues to capture new images, and the system dynamically updates the pose estimation.

In some cases, the interaction system processes images or videos from cameras on the AR device. The AR device captures images or video of the environment that can include the external 2D display. These images are analyzed to detect specific markers or features on or around the display. Accelerometers or gyroscopes in the AR device or embedded within the display system itself can also provide data related to the display's orientation.

In other cases, the interaction system identifies the position and pose of an external 2D display using camera images from an AR device by processing the images using computer vision techniques that process the images to detect, analyze, and interpret various features of the display in order to determine its exact location and orientation in the user's environment.

The AR device's cameras capture images or video streams of the environment. The system can process the images to perform object detection, and may identify that a display (such as the external 2D display) is located within the area.

In some cases, the AR devices apply edge detection to identify edges within the image. These edges delineate the boundaries of objects, such as an external 2D display, and can be particularly useful for outlining the rectangular shape of a display. The AR device applies edge detection helps to define the contour of the display, which can be used to determine the orientation and size of the external 2D display.

In some cases, the AR device applies machine learning models trained on images of displays which can recognize specific patterns or shapes associated with typical display outlines. For example, a machine learning model can be employed by the AR device to classify parts of the image as belonging to a display based on learned features from training examples.

If the AR device is equipped with multiple cameras, the AR device can apply stereo vision techniques to estimate the depth by comparing the parallax between images taken from slightly different viewpoints. In some cases, the AR device includes depth sensors that project a light pattern onto the scene and measure the return time to calculate depth directly, helping to establish how far away the display is, such as a structured light depth sensor. In other cases, the AR device includes a time of flight sensor that measures the time it takes for emitted light to bounce off an object and return to the sensor, allowing an AR device to calculate the distance and depth of objects by using the speed of light to determine the object's proximity.

Once the edges and depth are determined, the AR device can apply geometric transformations to calculate the angle of the display relative to the camera's viewing axis by using trigonometric methods to infer the orientation based on the perspective distortion observed in the images. In some cases, the AR device uses Perspective-n-Point (PnP) Problem algorithm when specific feature points on the display (like corners or unique markers) can be identified. The 2D coordinates of these points in the camera image and their known 3D coordinates in the physical world allow the AR device to solve for the camera's position and orientation relative to the display.

The interaction system accesses a two-dimensional (2D) camera image captured using a camera on an augmented reality (AR) head-mounted device. The interaction system captures 2D images reflecting the user's current view of the real world, which the AR system augments with virtual elements.

The camera used is integrated into the head-mounted device, designed to capture wide-angle views that align closely with the human field of view, thereby enhancing the immersive experience.

The 2D image is used by the interaction system to understand and interact with the three-dimensional structure of the environment. The image data serves as a reference point against which other sensory and tracking data are synchronized and interpreted, facilitating the creation of a cohesive and interactive augmented space.

The features described herein refer to the use of one image. However, it is appreciated that features described herein can use multiple images, vice versa, or one or more video streams.

In some cases, the interaction system can use a 2D camera image from a monocular camera. While the image can be in grayscale, it is appreciated that the image can include a color image.

Grayscale images may only include intensity information, which simplifies the processing load on the AR system. This can be advantageous in scenarios where computational resources are limited or when high-speed image processing is crucial. In depth estimation, intensity gradients in grayscale images can be sufficient to identify features and changes in a scene, which are essential for tasks like feature tracking and motion detection.

Color images provide additional data that can be used for more sophisticated image processing tasks. The use of color can improve the detection and differentiation of features within the scene, especially in complex environments where color cues help distinguish between objects that might otherwise appear similar in grayscale.

In some cases, color data is used not just for visual fidelity but also for functional purposes such as object recognition, scene segmentation, and more advanced depth inference methods that leverage color consistency across different viewpoints.

In FIG. 8, the AR device 806 can identify a marker 812 on the 2D display and can derive information regarding the external 2D display from the marker, such as location or orientation. In some cases, the AR device performs object detection and identifies edges of the external 2D display, such as edge 814, which can be used to identify the external 2D display and the size of the display.

In some cases, the 2D display can display content such as text and the AR device can detect the content via the camera. The AR device can use that gathered information to determine the screen's resolution and size.

For example, the 2D external display can display standardized text, a grid pattern, or other objects, such as the graph 816 in FIG. 8. The content is designed with known dimensions or characteristics, such as specific font size, grid spacing, or graph size.

The AR device captures images of the displayed text, grid, or content using its camera and applies computer vision techniques to recognize and analyze the characteristics of the displayed content. For example, the AR device may detect the edges of the text or the intersections of a grid.

By measuring the pixel dimensions of the text, grid lines, or content as captured in the image and comparing these measurements to the known size of the text or grid lines, the AR device can estimate the screen's resolution. For example, if a text designed to be 10 pixels high in a digital file appears to occupy more or fewer pixels on the captured image, the AR device can make adjustments to the estimation of the screen's pixel density.

Using the resolution data and the measured extent of the known content (such as a grid that spans the entire screen), the AR device can calculate the physical dimensions of the screen by projecting the pixel dimensions back into real-world measurements using the estimated resolution.

In some cases, the interaction system premaps the characteristics of an external 2D display via a detailed initial setup where the physical and spatial attributes of the display are measured and recorded in a database or mapping system before actual deployment or use, such as in fixed-installation environments (e.g., auditoriums or lecture halls) where the display's location and orientation do not change frequently.

To premap a display, the AR device and/or technicians can identify the position and dimensions of the display. This can include not only the coordinates of where the display is located but also its height, width, and any tilt or angle it might be set at (its pose).

The physical parameters can be entered into a spatial mapping system or a digital twin of the environment. The system can then use this premapped data to automatically adjust any content that is projected from AR devices, that the screen and virtual objects align correctly.

In some cases, the characteristics of an external 2D display can be manually entered by a user. A user interface on the AR device or a connected application can allow the operator to input the relevant data about the display, such as the position (XYZ coordinates), orientation (pitch, yaw, and roll angles), and size (height and width) of the display.

At operation 706, the interaction system receives user input from a user of the AR device associated with an interaction with a virtual object located within a real-world environment. The AR device 806, equipped with various sensors, captures input from the user. This input can be in different forms, such as touch gestures on the device's surface such as AR controller 818, voice commands captured via a microphone, or physical gestures and movements recognized by the device's cameras or motion sensors. In some cases, the inputs can include eye-tracking to determine where the user is looking, allowing for gaze-based interaction with virtual objects.

If the AR device has a touch-sensitive interface (like a tablet or smartphone used in AR mode), the user can interact with virtual objects by tapping, swiping, or pinching on the screen. For head-mounted displays or glasses, the system may recognize gestures or head movements as inputs by using accelerometers, gyroscopes, and cameras to detect and interpret the user's physical movements. Voice recognition systems can interpret spoken commands, enabling the user to interact with virtual objects through language, which is highly useful in situations where hands-free operation is preferred.

Once the input is detected, the system determines the relevance and intended target of the input within the AR environment by mapping the physical input to the virtual space where the AR objects reside, such as the virtual skull 820. For example, if the user points or gazes at a specific virtual object and makes a selection gesture, the system interprets this action to understand which object is being interacted with and what specific interaction (e.g., opening, moving, resizing) is being requested.

The system can also understand the input in the context of the current state of the AR environment. This contextual processing ensures that the system's response is appropriate to the situation. For example, if a user gestures to "grab" a virtual tool, the system will check if the tool is within reach and respond accordingly.

In some cases, the AR system is designed to show interactive tools and controls only to the user wearing the AR device, while keeping these elements invisible to anyone not equipped with AR technology. This is achieved through user-specific rendering where the AR content, including menus, pointers, or manipulation widgets, is only generated on the displays of the AR devices. This ensures that the virtual interactions are private and personalized, enhancing the user's control over the virtual elements without altering the shared physical space visually for others.

For example, the AR controller 818 can be a virtual controller that only the user of the AR device can see. The audience 822 may not see the virtual AR controller 818, and the AR controller 818 may not be displayed on the external 2D display 814.

To extend battery life and optimize device usage, the AR system can turn off its display during periods of inactivity or when not directly needed for visual output. For instance, when the user is primarily engaged in voice-controlled or gesture-controlled interactions, the visual display can be temporarily disabled.

The system can rely on other sensory feedback mechanisms such as auditory (sound cues or verbal feedback) or haptic (vibrations or tactile feedback) to guide the user's interactions with virtual objects. This method allows the user to continue interacting effectively with the AR environment without the constant need for visual confirmation, thereby saving power.

In some cases, the AR system continuously monitors user interactions to determine their engagement with virtual objects. The sensors detect gestures, head movements, eye tracking, or touch interactions. If the user is actively manipulating virtual objects or navigating through virtual environments, the AR display remains active.

Conversely, if there is a period during which no direct interaction with virtual objects is detected (e.g., no gestures or commands are issued for a certain threshold time), the system may conclude that the AR display activation is currently unnecessary. In such cases, in some examples, the system only causes display on the external 2D display.

In some cases, the AR system selectively deactivates display of certain items in the AR display. For example, the AR system may only fully display the virtual object that the user is currently manipulating or is near. The AR display may shut off display of other virtual objects. In some cases, the AR display may display an outline or some other form of the virtual object without fully rendering the virtual object in the AR display.

The display's activity can also be tied to the presence of virtual content that needs user attention. For example, during a presentation or a lecture where the user is mostly observing rather than interacting, the AR device can recognize phases where no virtual enhancements or interactions are required and can turn off the display. This could also be controlled through software where sections of a presentation without augmented overlays automatically trigger a display shutdown.

The AR system can implement algorithms, such as machine learning models, that can intelligently analyze the context of usage. These algorithms assess whether the user is actively engaging with the device or if it's being used passively. For instance, during a presentation, the algorithm can differentiate between active engagement periods (where the user interacts with data) and passive periods (where the user is simply watching or listening).

The AR system can use a combination of inputs from multiple sensors to make more accurate decisions about turning the display off and on. This might include motion sensors, ambient light sensors, cameras, and microphones to accurately gauge the user's engagement and the environmental context.

The AR system may develop specific energy-saving protocols that automatically adjust the display settings based on usage patterns. This could include dimming the display before turning it off completely or switching to a low-power mode where only essential information is displayed in a simplified format.

The AR system may allow users to manually control display settings through a menu or voice commands, giving them the ability to override automatic settings based on personal preference or specific needs of the task at hand. The AR system can provide options in the device's settings menu for users to customize how aggressively the display turns off based on their usage habits. Users could select from various profiles ranging from energy saver to performance mode, depending on their priority between battery conservation and constant display readiness.

In some cases, the AR system enables multiple AR devices to collectively interact with the virtual object. This feature enables multiple users, each equipped with their own AR devices, to interact collectively with the same virtual objects or environment. This capability can be implemented in collaborative tasks, such as team-based training, joint design projects, or multiplayer gaming, where users need to work together or share virtual experiences in real-time.

The AR system synchronizes the interaction across different devices, ensuring that all changes to the virtual environment made by one user are instantly, or in close to real-time, visible to others. This requires robust network communication to handle the exchange of data and updates between devices, ensuring consistency and real-time responsiveness of the virtual objects.

For example, in a collaborative design session, multiple engineers can manipulate and modify a shared virtual prototype from different perspectives. Each participant's interactions (like rotating, scaling, or annotating the model) would be immediately reflected on all other users' AR displays, allowing for a cohesive and interactive workflow.

These features collectively enhance the functionality and usability of AR systems in various settings, enabling more efficient, private, and energy-conscious interactions with virtual objects, as well as supporting collaborative engagements across multiple users.

The external 2D display displays all updates and interactions occurring from each connected AR device. This allows everyone in the room, regardless of whether they are wearing an AR device, to see a unified view of the interactions and changes made by individual AR users.

The system synchronizes data across all devices and updates the external display in real time, ensuring that any modifications to virtual objects or the environment made by one user are immediately reflected on the external display. The external display, therefore, acts not only as a mirror of the augmented reality experienced by the users but also as an interactive canvas that bridges the gap between digital and physical collaboration.

At operation 708, the interaction system identifies one or more locations of corresponding viewers of the external 2D display within the real-world environment. The interaction system strategically placed cameras around the 2D display capture real-time images or video feeds of the audience area. These cameras may use advanced computer vision algorithms or machine learning models to detect human figures, human faces, and locations, as well as track their movements.

In other cases, images from a camera of the AR device is used to identify the location of the corresponding viewers. The AR device can identify the locations of the external 2D display and/or the viewers in 3D space.

For example, the AR device can generate tracked three-dimensional (3D) points using an odometry system on the AR head-mounted device. The interaction system applies an odometry system integrated into the augmented reality (AR) head-mounted device.

The interaction system tracks the spatial movement of the AR device through its environment, capturing the 3D coordinates of specific points in space as the user moves. The odometry system in an AR device can use a combination of sensors and computational methods to track movement and orientation.

In some cases, the interaction system uses Visual Odometry (VO) by using the camera itself to capture sequential images and then employs one or more computer vision techniques to estimate the device's motion based on changes observed in these images. By identifying common features or landmarks in successive frames (such as the external 2D display and viewers), the system can infer the relative motion of the camera—and hence the device—across frames.

In some cases, the interaction system uses an Inertial Measurement Units (IMUs) that includes one or more accelerometers and gyroscopes that measure acceleration and rotational changes, respectively. The IMU data is used by the interaction system to receive real-time updates on the device's orientation and acceleration, which are used in the calculation of changes in position over time.

In some cases, the interaction system uses a combination of data from visual and inertial sources, such as via Visual-Inertial Odometry (VIO). This combination allows for more accurate and robust tracking, compensating for the individual weaknesses of each method (e.g., visual occlusions or IMU drift).

The tracked 3D points are generated by the odometry system. The system identifies distinct features in the environment that can be easily tracked across multiple images or sensor readings. These features could be edges, corners, or other notable visual markers.

As the device moves, the system continues to monitor these features (such as the external 2D display and the viewers), updating their positions in 3D space relative to the movement of the device. This tracking can be performed by projecting the detected features back into a 3D space using the known parameters of the camera (like its focal length and sensor characteristics) and the motion data from the IMU.

The culmination of tracking multiple points across the device's trajectory results in the formation of a "point cloud," which represents the spatial layout of the environment in three dimensions. Each point in this cloud has associated 3D coordinates that correspond to a real-world position relative to the device's starting location.

As such, the AR device can identify a relative or absolute distance between objects, such as the AR device, the individual viewers, and the external 2D display.

In some cases, infrared sensors can be used to detect heat signatures from the bodies of viewers, providing data on their locations even in low-light conditions. In some cases, the AR devices use ultrasonic sensors that can emit and receive ultrasonic waves, measuring the time it takes for the waves to bounce back from objects (people) to calculate distances, thereby helping to map viewer locations relative to the display.

In some cases, the AR device applies image processing that processes the visual data from cameras to identify faces, helping to distinguish between viewers and other elements in the room. This technology can also gauge the orientation of the viewers—whether they are facing towards or away from the display.

In some cases, the AR device identifies the location of viewers relative to an external 2D display, particularly in terms of their position relative to the center of the display. The default center view of the external display, such as the center view line 828 of FIG. 8, is directly in front of and/or at a height that aligns with the middle of the screen.

This center view represents the angle and position that provides the most undistorted and fully visible view of the screen content. The AR device can identify the center view line using geometry based on the dimensions and orientation of the display to calculate the center view line.

The AR device then uses images from cameras on the AR device to capture images of viewers. The AR device applies computer vision algorithms to analyze these feeds to detect faces and bodies, providing raw data on the position of each viewer.

The AR device then determines the angle and distance of each viewer from the center view line by drawing virtual lines from the center view line to each viewer's position and measuring the angle these lines make with a baseline that runs perpendicular through the center of the display. In some cases, the AR device identifies view-rays by the audience and compares the view-rays to the center view line.

Viewers can be categorized based on how far and in which direction they are from the center view line. For instance, viewers might be identified as being 'slightly to the left,' 'far right,' or 'directly center.'

At operation 710, the interaction system generates display data of the virtual object for the external 2D display based on the pose of the external 2D display and the one or more locations of the corresponding viewers.

Based on the data about viewer locations and/or deviations from the center view line, the system can adjust the display parameters. For instance, if a significant number of viewers are off to one side, the system may shift visual focus or enhance audio-visual clarity towards that side.

In some cases, the AR device generates display data for the external 2D display based on viewer locations by adapting the visual content so that it is optimized for the focus and perspective of a particular viewer or group of viewers. This adaptive display enhances viewer engagement and ensures that all participants have an optimal viewing experience, particularly in settings where the audience is spread out or located at varying angles and distances from the display.

The system analyzes the collected data to determine viewing angles and focal points. If a significant number of viewers are concentrated in a particular area or focused in a specific direction, these regions are identified as key focus areas for content adjustment.

The display content is rendered in a way that optimizes visibility and clarity for the identified focus areas. For example, if the focus is off to the right side of the display, the virtual objects or critical elements of the presentation might be shifted or enlarged on that side to ensure they are clearly visible to the majority. In some cases, the virtual objects may be modified to shift the focus for the audience where non-essential elements of the content could be blurred. For audiences that span a wide range of angles or objects that have many important angles, the AR device may use a fisheye distortion to help draw the content that would be cut-off outside the display while keeping the center relatively distortion free.

Adjustments are made to account for the perspective and angle of viewing. The AR device may skew or rotate visual elements so that they appear correct from the viewer's perspective, enhancing the illusion of depth and maintaining the integrity of visual proportions.

Depending on the distance and angle of the viewers, the brightness and contrast settings of the display can be adjusted to compensate for any loss in visibility or clarity that occurs with off-center viewing. Similar adjustments might be made for color saturation and hue to ensure that all viewers experience consistent color quality, regardless of their position.

In some cases, the AR device identifies movement of viewers (using features described further herein) to track the general movement and orientation of the audience. For example, the AR device can use machine learning models that identify and track the movement patterns of viewers within the captured video frames.

By analyzing these movement patterns, the system can determine where the majority of the audience is focusing their attention. Frequent or concentrated movements towards a particular area, especially if synchronized with specific parts of a presentation or event, can indicate higher engagement levels.

In some cases, the AR device identifies emotional or sentimental responses from users by assessing video feeds to determine facial expressions and detect emotions such as interest, confusion, or excitement. This emotional data can help the AR device to focus on engaged audience members who are focused on the screen, or to focus on disengaged audience members to reengage them.

In some cases, the AR device is configured to identify a focal point of an area, such as a theater or presentation room that may already have seats with a main focal point. In other cases, the AR device may access sensor data with sensors integrated into seats to detect occupancy.

In some cases, the AR device can access data on orientation of the seats and identify the seats that are currently occupied by viewers using one or more features descried herein. In some cases, the AR device can access ticket sales data for assigned seating. As such, the focal point can be determined by one or more of such data, such as the orientation or ticket sales (e.g., providing more or less weighting on one seat or one type of data).

In some cases, the AR device applies facial-direction identification to identify the general direction that an individual is looking, such as based on computer vision or machine learning models as further described herein. Aggregating this data across many users can provide a heat map of gaze concentration, highlighting areas on stage or on a screen that attract the most visual attention, or identifying users that are focused on the screen and applying greater weighting to these users when identifying a focal point.

As viewers move and their focus changes, the system continuously updates the viewer location data and dynamically adjusts the display content in real-time. This ensures that the content remains optimized for viewer engagement throughout the event or presentation.

At operation 712, the interaction system transmits the display data to the external 2D display system causing display of a rendering of the virtual object on the external 2D display to the identified one or more viewers. The AR device transmits the prepared display data to the external 2D display system which bridges the gap between the virtual content generated by the AR system and the real-world interface that the audience interacts with.

The AR device sends data, which can include rendering instructions for virtual objects, via established communication protocols such as wired connections like HDMI or wireless technologies such as Wi-Fi or Bluetooth. The content sent to the display system is specifically tailored based on prior analytics of viewer locations and/or engagement levels.

Once the data reaches the external 2D display system, the external 2D display system processes the incoming instructions to render the virtual objects on the external 2D display. This rendering takes into account various factors such as the optimal resolution, brightness, and orientation, ensuring that the virtual objects appear correctly from the viewers' perspectives.

In scenarios where there are multiple audience groups, such as a group of viewers on the left side 822 and a viewer on the right side 830, the external 2D display system can be configured to show different images at different angles, such as using directional screens or lenticular displays, which can project different images at different angles.

The external 2D display system enables each section of the audience to see images that are specifically tailored to their viewing angle. For example, the same virtual object can be rendered in slightly different ways to cater to the visual perspective of the left and right groups, ensuring that both groups receive a visually coherent and contextually relevant experience.

System Architecture for Displaying AR Content to AR-Deprived Audience

Figure 9:
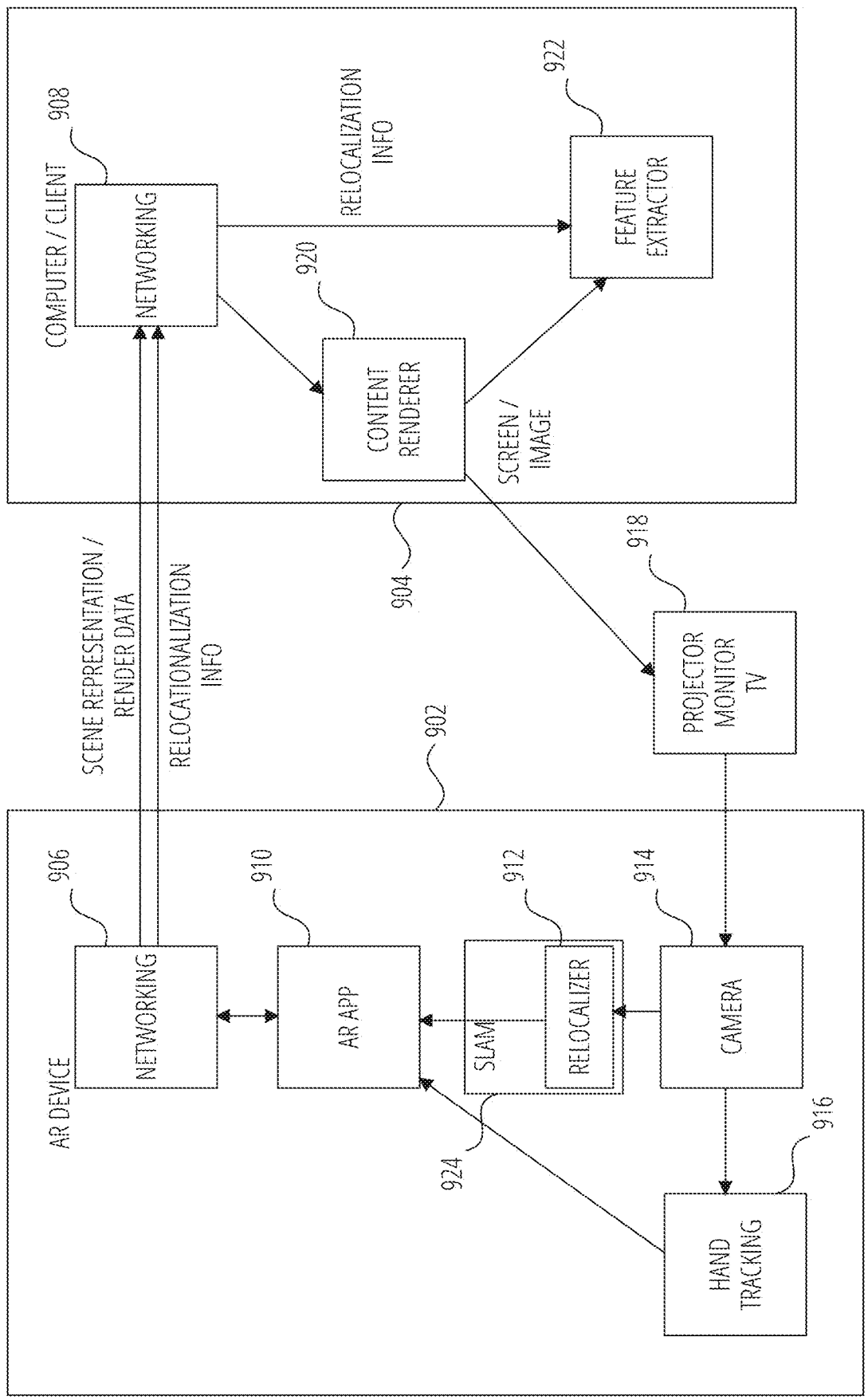
FIG. 9 illustrates a system architecture for displaying AR content to an AR-deprived audience, according to some examples.

FIG. 9 illustrates a system architecture for displaying AR content to an AR-deprived audience, according to some examples. The AR device 902 is equipped with a networking module 906 that is configured for establishing and maintaining communication between the AR device and other systems, such as a computer or client 904 (e.g., the external 2D display system). The networking module enables the AR device to send and receive data over various types of networks, including wired connections like Ethernet or wireless protocols such as Wi-Fi and Bluetooth. The computer/client also has its own networking module 908 that can perform one or more of the features of the networking module for the AR device.

The AR device also hosts an AR application 910, which is the software backbone that performs all the augmented reality functions necessary for the device's operation. This app encompasses a wide range of functionalities, including the processing of input data from the device's sensors (like cameras and accelerometers), rendering of virtual objects, and handling user interactions with the augmented environment. The AR app interprets and integrates real-world data captured by the device, overlaying this information with virtual elements to create a cohesive AR experience. The AR app also manages the interaction logic, determining how virtual objects respond to user inputs and environmental changes.

In some cases, the relocalizer 912 within the AR device is part of the SLAM system that performs spatial understanding and environmental interaction capabilities of the system by identifying and maintaining the positions and orientations of various elements within a 3D point map. This can include the AR device itself, the external 2D display, and viewers in the environment. In some cases, the relocalizer itself performs one or more functions of the SLAM system and/or vice versa.

By utilizing a combination of sensor data and sophisticated algorithms, the SLAM system continuously updates the spatial coordinates of these items, ensuring that the augmented reality content is accurately aligned with the physical world. The SLAM system helps the AR system adjust to movements and changes in the environment, maintaining the coherence and relevance of the virtual overlays as viewed through the AR device.

The AR device is equipped with a camera 914 that captures images and videos of the user's surroundings. This visual data can be used in multiple AR functions, including object recognition, environmental mapping, interaction tracking, and tag identification.

The camera feeds real-time visual information to the AR system, which uses this data to analyze the environment, detect changes, and respond accordingly. The captured images and videos serve as the primary input for creating and updating the digital overlays that the user sees, making the camera essential for the immersive and interactive elements of augmented reality.

Hand tracking 916 is another feature of the AR device, which involves detecting and interpreting the movements of the user's hands. This capability allows users to interact with virtual objects through natural gestures, such as pinching, grabbing, or swiping.

The AR system uses algorithms to track the position, orientation, and motion of the hands relative to the rest of the environment, translating these physical movements into inputs that control the virtual elements within the AR space. Hand tracking is particularly important for creating a more intuitive and engaging user experience, enabling direct manipulation of the augmented content without the need for traditional input devices like keyboards or controllers. This feature fosters a deeper level of interaction, allowing users to "touch" and manipulate virtual items as if they were real, enhancing the overall sense of presence within the augmented environment.

The content renderer module 920 within the computer or client system prepares visual content for display on external devices such as projectors, monitors, or TVs. This module processes input data—such as images, videos, or graphical elements—into a format suitable for high-quality visual presentation on these displays. The renderer takes into account various factors such as the resolution, aspect ratio, and color profiles of the display devices to ensure that the content appears clear, vibrant, and correctly scaled.

The computer or client system includes a feature extractor module 922, which identifies specific features within the content that is to be rendered. This module analyzes the visual data to detect distinct naturally occurring elements, patterns, or augmented markers (e.g., landmarks). Once these features (e.g., landmarks) are identified, tagged, and transmitted to the AR device while the raw content is sent to the projector, monitor, or TV 918, they are tagged systematically within the content's metadata.

When the tagged content is displayed, the AR device uses its camera to capture these visual landmarks. The presence of these landmarks within the visual field allows the AR device to perform relocalization where the AR system recalibrates its understanding of its position and orientation relative to the external display and the surrounding environment.

By recognizing and interpreting these landmarks, the AR device can adjust its spatial calculations, ensuring that the augmented reality elements it projects align accurately with the physical world.

In this augmented reality setup, SLAM (Simultaneous Localization and Mapping) technology is utilized in a dual-capacity mode to enhance the accuracy and efficiency of the AR system. SLAM continuously operates on the AR device to dynamically map the environment and update the device's understanding of its position within that space by detecting and tracking points in the real world.

Concurrently, the system integrates a secondary layer of SLAM that involves points pre-seeded from the video stream being displayed on the monitor. These seeded points, which are identified and tagged by the feature extractor in the content before it is displayed. This setup allows the AR device to use these pre-seeded points as additional reference points in its ongoing SLAM processes. The integration of both live and pre-seeded data points allows the SLAM system to detect the external display.

In this scenario, the workload is strategically distributed between the AR device and the client (computer or client system) to optimize performance and efficiency, leveraging the strengths of each component in handling specific tasks within the augmented reality framework.

The client primarily focuses on high-demand processing tasks such as content rendering and feature extraction by rendering the visual content that is to be displayed on external outputs like projectors, monitors, or TVs, ensuring that it matches the required specifications for high-quality display. This involves converting raw data into visually appealing formats, adjusting for various display settings, and embedding detailed landmarks within the content for subsequent interaction. Additionally, the feature extraction process, executed by the client, identifies and tags critical elements in the content. These tagged features are essential for the AR device's relocalization and interaction processes, enabling precise alignment with the physical environment.

On the other hand, the AR device handles real-time, interactive tasks that require immediate responsiveness, such as capturing and processing visual data from its environment, detecting and interpreting tagged features, and performing relocalization. By utilizing its onboard sensors and cameras, the AR device continuously scans the environment to capture the tagged content displayed on the external screens. This enables the AR device to adjust its perception of the spatial layout, ensuring accurate overlay of augmented elements within the user's view. Moreover, the AR device also manages hand tracking and other gesture-based interactions, allowing for intuitive user control over the virtual content. This division of labor allows the client to manage heavy-duty processing tasks without taxing the more limited processing capabilities of the AR device, which is optimized for fast response and interaction capabilities, maintaining a smooth and immersive user experience.

Displaying AR Content During a Presentation Using a Laser Pointer

Figure 10:
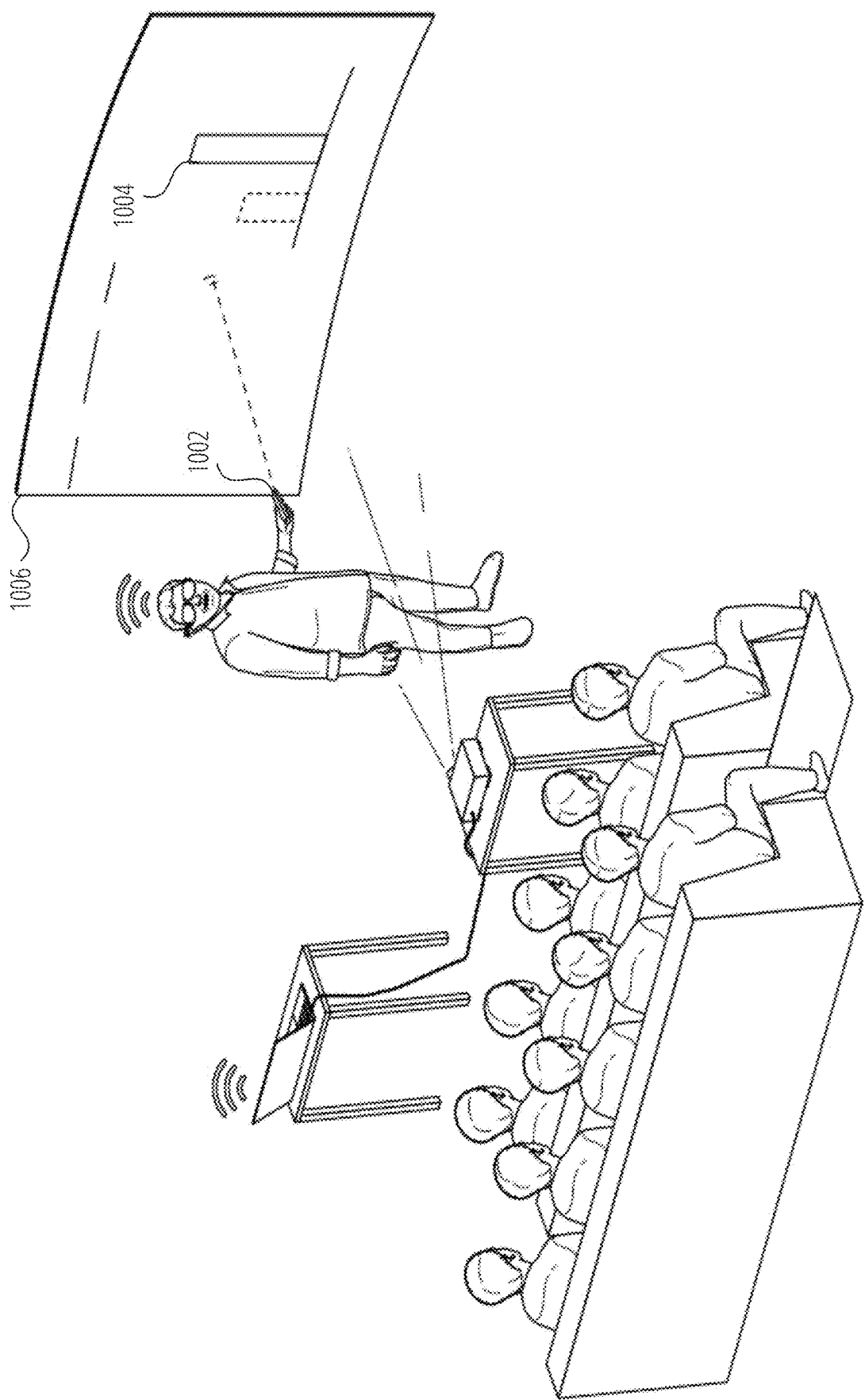
FIG. 10 illustrates displaying AR content for a presentation using a laser pointer, according to some examples.

FIG. 10 illustrates displaying AR content for a presentation using a laser pointer, according to some examples. FIG. 10 illustrates the integration of the features herein described—feature extraction, and AR device capabilities—into a presentation scenario with a user using a laser pointer.

Although examples described herein feature a physical laser pointer, it is appreciated that the features can be applied to virtual laser pointers (e.g., controlled by hand and/or finger gestures), and/or the like. In some cases, the features described herein can include a non-AR computing device that is controllable via a virtual mouse and/or keyboard emulation that is controlled via an AR headset.

In a presentation setting, the AR device, equipped with SLAM technology, continuously maps the room and updates the device's understanding of its position relative to the environment. This real-time mapping includes identifying the location and orientation of the presentation screen within the space.

As the presenter uses a laser pointer 1002, the AR device tracks the movement of the laser dot on the 2D screen. SLAM helps in precisely identifying where the laser is pointing by referencing the pre-mapped coordinates of the screen in the physical space.

Before the presentation, specific features or markers can be embedded into the presentation content that is displayed on the 2D screen. These might include hidden landmarks or visible cues that are only recognizable by the AR system, not by the audience.

As the presenter points to specific content or slides with the laser pointer, the AR device's camera captures these interactions. The feature extractor recognizes these tagged features in real time as they are illuminated by the laser pointer.

The AR device can process the identified landmarks or features activated by the laser pointer to trigger specific augmented reality effects or additional content. For example, pointing the laser at a tagged graph might trigger an AR display of more detailed data or a 3D model related to the graph's content, such as display of a graph 1004.

This triggered AR content can be viewed by the presenter through AR glasses or a similar device, providing an enhanced layer of information that is not visible on the 2D screen but adds depth to the presentation.

For audience members equipped with compatible AR devices, the same landmarks recognized by the presenter's device can be used to display personalized data, annotations, or supplementary information directly to their AR interfaces. This feature can make presentations more interactive and engaging, allowing audience members to explore additional information layers at their own pace.

Based on the audience's location and engagement, which can be detected through their focus or interactions with the AR content, the presentation system can dynamically adjust what is displayed on the 2D screen. For instance, if the audience engagement data indicates high interest in a particular topic, the presenter can receive a cue to delve deeper into that topic or modify the presentation flow in real-time.

By applying these advanced AR features in a presentation setting, the experience transcends traditional slide shows, offering a richer, more engaging, and interactive session. This approach not only enhances the presenter's ability to convey information but also significantly boosts audience participation and retention of the presented content.

Applying the advanced features of an AR system to a curved screen 1006 presents unique opportunities for enhancing interactive displays and presentations. SLAM technology can be adapted to account for the curvature of the screen by mapping not just the position and orientation, but also the curvature of the surface itself.

This requires more sophisticated algorithms capable of recognizing and interpreting curved geometries as opposed to flat surfaces. By accurately mapping the curved screen, the AR device can more precisely overlay augmented content that aligns with the physical dimensions and shape of the screen.

For a presenter using a laser pointer or for interactive content displayed on the curved screen, SLAM continuously updates the system's understanding of the pointer's location relative to the curved geometry. This allows for real-time tracking of interactions across the non-linear surface, ensuring that any interaction with the content is accurately detected and responded to.

The feature extraction system is trained to be sensitive to the unique challenges posed by a curved screen, such as distortion of images and text. Landmarks or markers used for triggering AR content or for tracking purposes may be adapted to be recognizable even when viewed at angles distorted by the curve of the screen.

When the feature extraction identifies these landmarks through the AR device's camera, the system can calculate the necessary adjustments for depth and perspective to ensure that the augmented content appears natural and undistorted to viewers, regardless of their angle of view.

Rendering content for a curved screen can involve adjusting the visuals to compensate for the curvature, ensuring that images and text do not appear stretched or compressed. This might involve dynamic warping of content based on the detected curvature parameters from the SLAM system.

Given that viewers might be spread around the curved screen at different angles, the AR system can use viewer location data to modify what each segment of the audience sees, enhancing visibility and readability. For instance, information density might be increased in areas with higher audience concentration or adjusted according to the typical viewing angles measured from different audience positions.

For viewers equipped with AR devices, the curved screen can serve as a trigger for immersive augmented reality experiences. For example, pointing an AR-enabled device at a specific part of the curved screen could overlay additional 3D content that appears to extend out from the screen or provide interactive elements that viewers can manipulate from their perspective.

Figure 11:
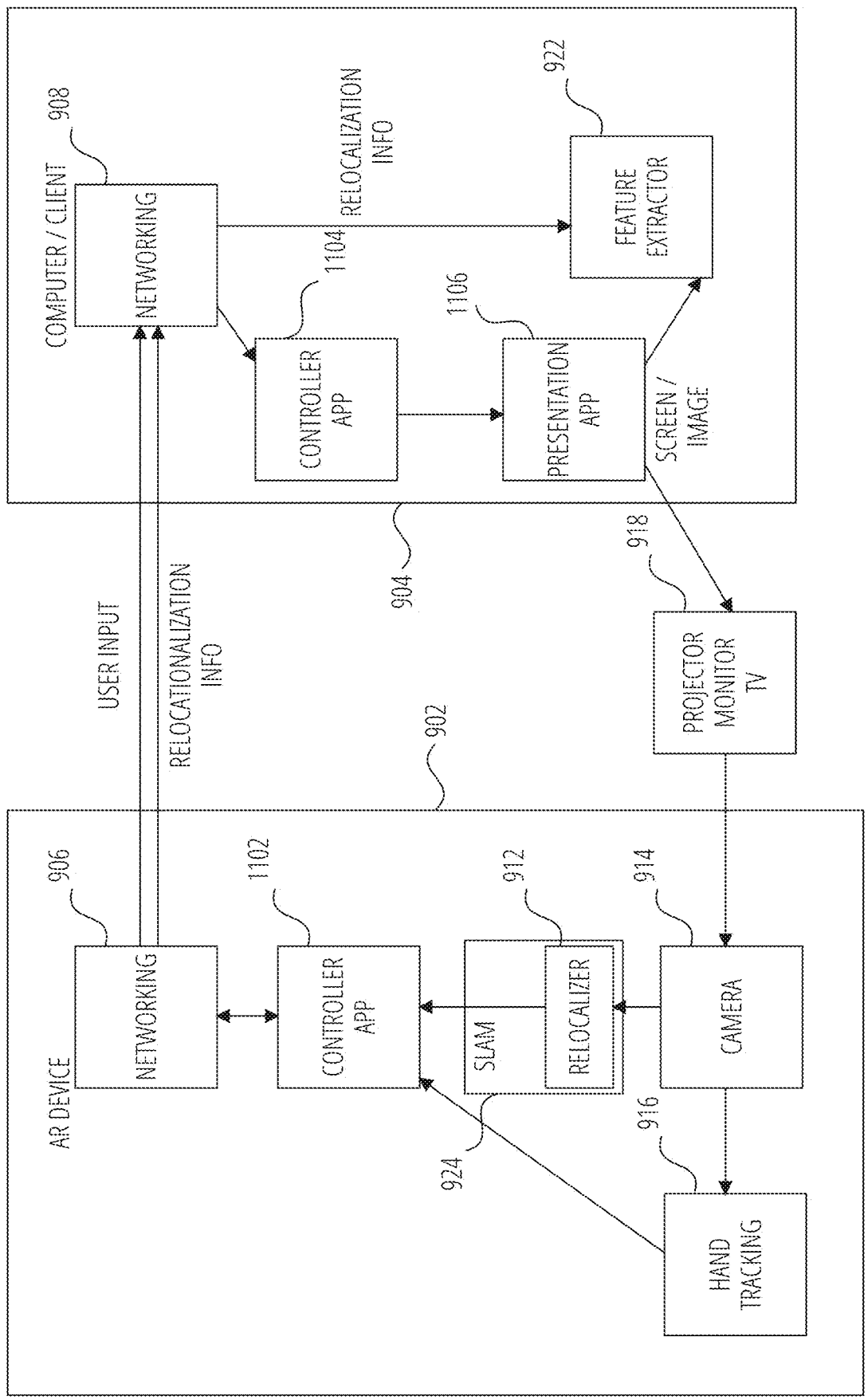
FIG. 11 illustrates a system architecture for displaying AR content to an AR-deprived audience for a presentation, according to some examples.

System Architecture for Displaying AR Content to AR-Deprived Audience for a Presentation FIG. 11 illustrates a system architecture for displaying AR content to an AR-deprived audience for a presentation, according to some examples. In this revised setup where both the AR device and the computer/client system feature controller applicant includes a controller app 1102 and 1104, along with the client having a specific presentation app 1106, the interaction and functionality between these components are enhanced to provide a more integrated and controlled presentation environment.

The controller app on the AR device is designed to handle user interactions and commands directly related to the augmented reality experience and to communicate these interactions to the client system. This includes the ability to navigate through AR content, manipulate virtual objects, or trigger specific actions within the augmented environment.

The controller app effectively acts as a remote control, sending specific instructions or commands to the client's presentation and controller apps. This could involve commands to change slides, adjust the presentation's pacing, or even modify the content being displayed in real time based on audience feedback or other interactive elements detected through the AR interface.

On the client side, the presentation app is responsible for managing and displaying the actual presentation content on the external 2D display (e.g., a projector or monitor). This app ensures that slides and other visual aids are rendered correctly, transitions are smooth, and any multimedia elements are played back without issues.

Complementing the presentation app, the controller app on the client side receives and processes commands from the AR device's controller app. It acts upon these commands to control the flow and elements of the presentation. For example, if the presenter using the AR device selects a specific slide or requests a particular video to be played, the client's controller app interprets and executes these commands in sync with the presentation app.

AR Content for Television Viewing

Figure 12:
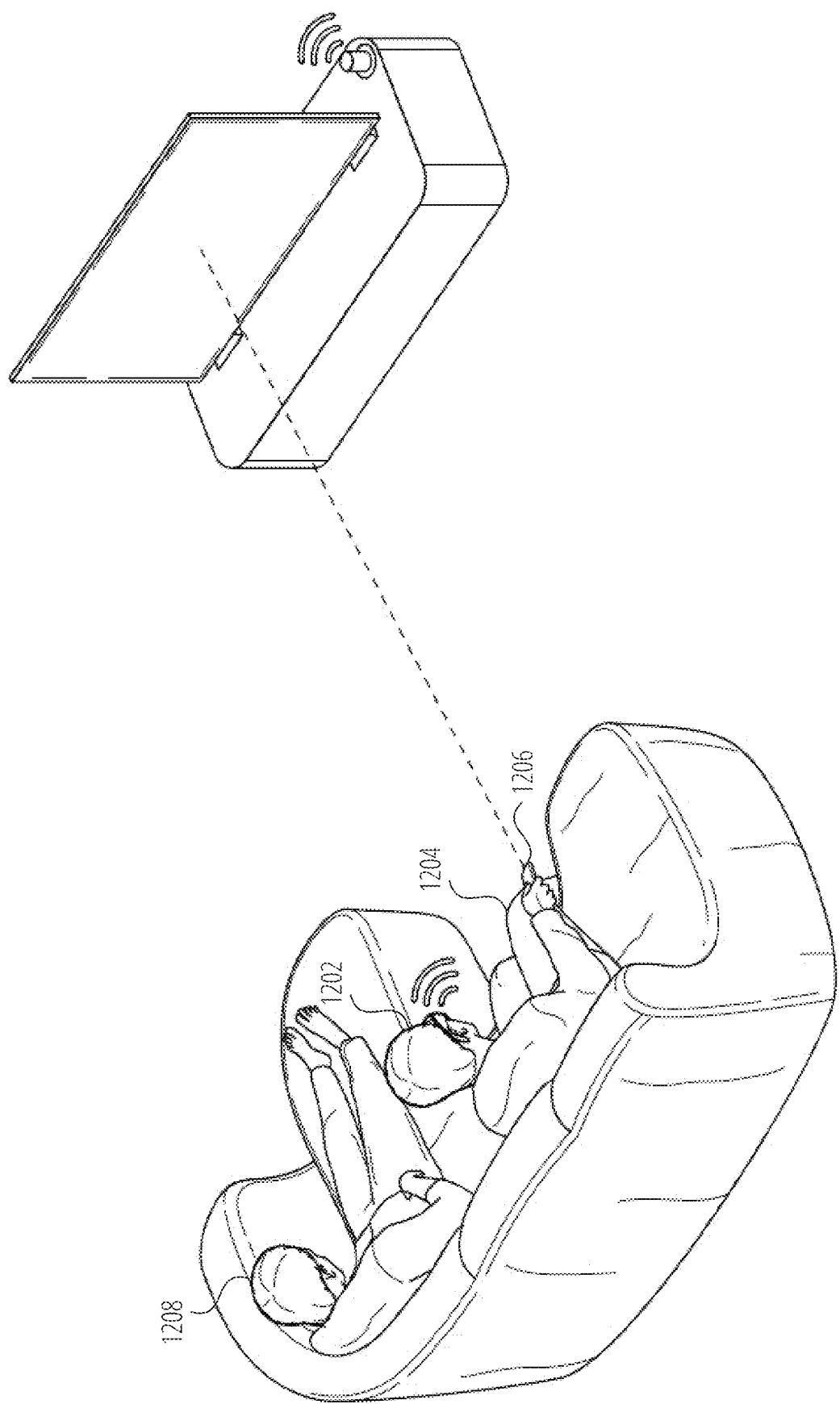
FIG. 12 illustrates presenting AR content for television viewing, according to some examples.

FIG. 12 illustrates presenting AR content for television viewing, according to some examples. The AR device 1202 worn by one user 1204 can include a remote control 1206 that can be used to receive commands from the user directed to the TV. This can include basic functions like changing channels or adjusting volume, as well as more complex interactions such as selecting content from streaming services or navigating the TV's interface.

The AR device can incorporate gesture recognition technology, allowing the user to perform gestures in the air to control the TV. For example, swiping right or left could change channels, while a pinching motion could adjust volume. In some cases, the AR device can perform actions without the need of any physical and/or virtual remote controller. These gestures are captured by the AR device's sensors, processed by the controller app, and translated into commands that are sent to the TV.

The AR device can display additional content visible only to the AR user. For instance, while watching a sports event, the AR device could overlay statistics, player bios, or live data feeds directly into the user's field of view without disrupting the viewing experience of the other person 1208 on the couch.

The AR device could also provide interactive features, such as instant replays on demand, zooming into specific areas of the screen, or even displaying alternative viewing angles, all personalized to the preferences of the AR user.

While the AR user interacts with the TV and accesses augmented content, the system ensures that these interactions do not intrude on or disrupt the viewing experience of the other user. The base content on the TV remains consistent for both viewers, maintaining the communal aspects of watching TV together.

Tags on a TV can be visible to an AR device user but invisible to another viewer, such as using light from the invisible spectrum, such as infrared (IR) or ultraviolet (UV). The TV or an attached device emits these wavelengths as landmarks directly onto the screen. The AR device is equipped with sensors specifically designed to detect these wavelengths, enabling it to see and interact with these landmarks while they remain invisible to the naked eye. This method leverages the differences in human and device perceptual capabilities regarding light spectra, providing a seamless way to embed interactive elements into a shared viewing experience without altering the visual content for other viewers.

Alternatively, high-frequency flickering landmarks can be utilized, where landmarks flicker at a rate beyond human flicker fusion threshold (typically around 60 Hz), but detectable by the high-speed sensors in the AR device. These landmarks are integrated into the visual display at a speed that appears constant to the human eye, thus remaining imperceptible while still being functional for AR interactions. This technique harnesses the limitations of human vision to create a layer of interactivity specifically tailored for AR users without any visual disturbance for non-AR viewers.

System Architecture for Sending Encoded Video to the 2D External Display

Figure 13:
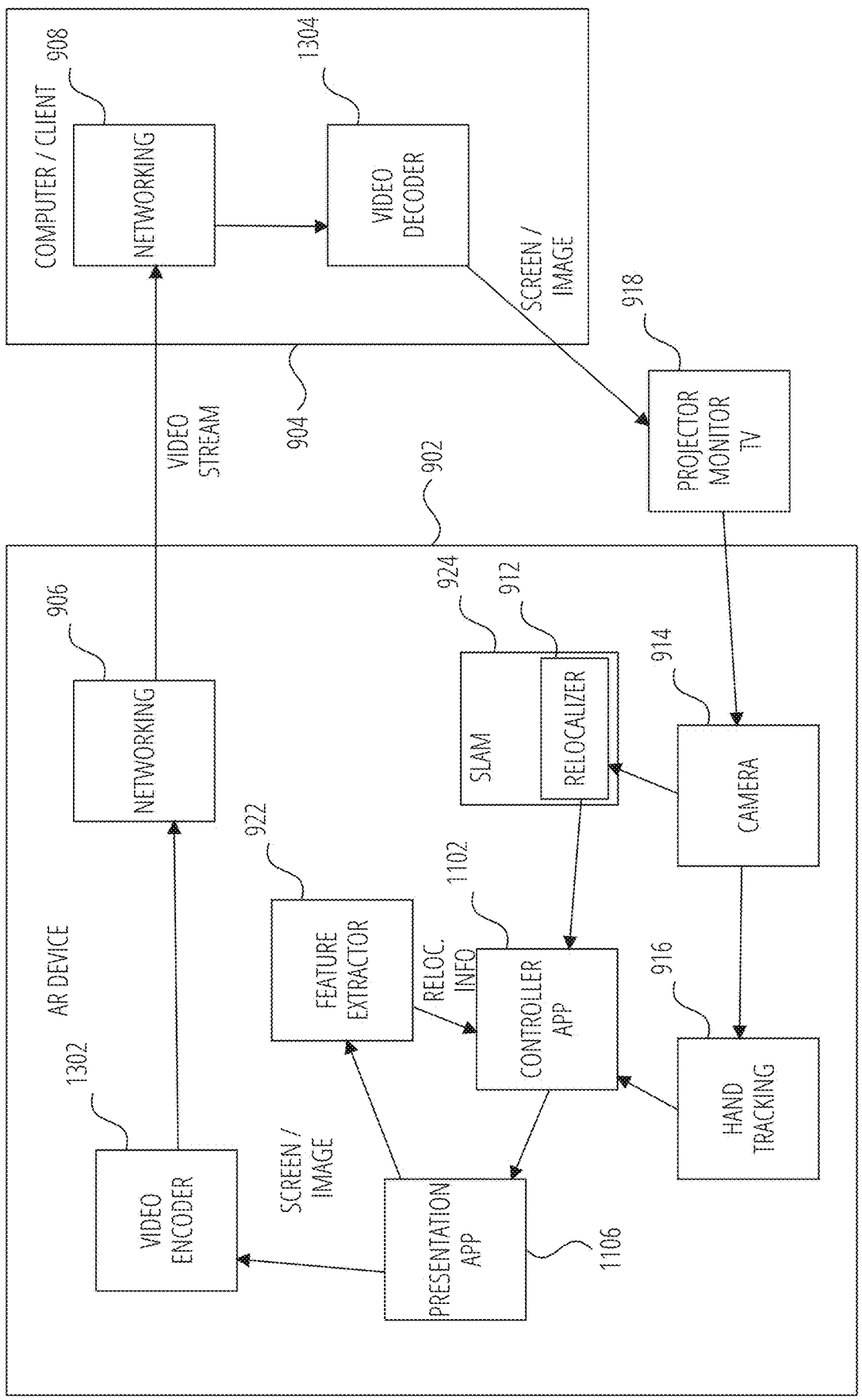
FIG. 13 illustrates a system architecture for sending encoded video to the 2D external display, according to some examples.

FIG. 13 illustrates a system architecture for sending encoded video to the 2D external display, according to some examples. In this architecture where the AR device incorporates more of the processing capabilities—including a video encoder 1302—and the client primarily has a video decoder 1304 and the system is designed to maximize the processing power of the AR device while simplifying the client device's role to mainly decoding and displaying the pre-processed content.

In this architecture, the AR device is essentially a self-contained unit that handles all the computational tasks required for AR functionalities. This includes running the presentation app 1106, which manages the content to be displayed; the controller app 1102, which processes input from the user to interact with the content; the feature extractor 922, which identifies and landmarks elements within the content for enhanced interaction; and the SLAM system 924 (containing the relocalizer 912), which continuously updates the device's understanding of its spatial orientation and positioning within the environment.

The AR device also integrates hand tracking 916 and camera functions 914. Hand tracking allows the device to recognize and interpret user gestures as input commands, facilitating a more natural interaction interface. The camera captures live video of the user's environment, which is essential for overlaying AR content onto the real world in a contextually relevant manner.

After processing the AR content, including any interactive or augmented elements, the device encodes this information into a video stream. The client decodes the video stream received from the AR device. Since all the processing is already handled by the AR device, the client performs video decoding to efficiently convert the incoming encoded video stream back into a displayable format.

Once the video is decoded, the client device displays the content on an external display to sends the screen/image data to the projector 918, such as a monitor, projector, or TV. This allows for the augmented content processed by the AR device to be viewed in a traditional viewing format, making it accessible to other viewers who might not have AR capabilities.

Data Communications Architecture

Figure 14:
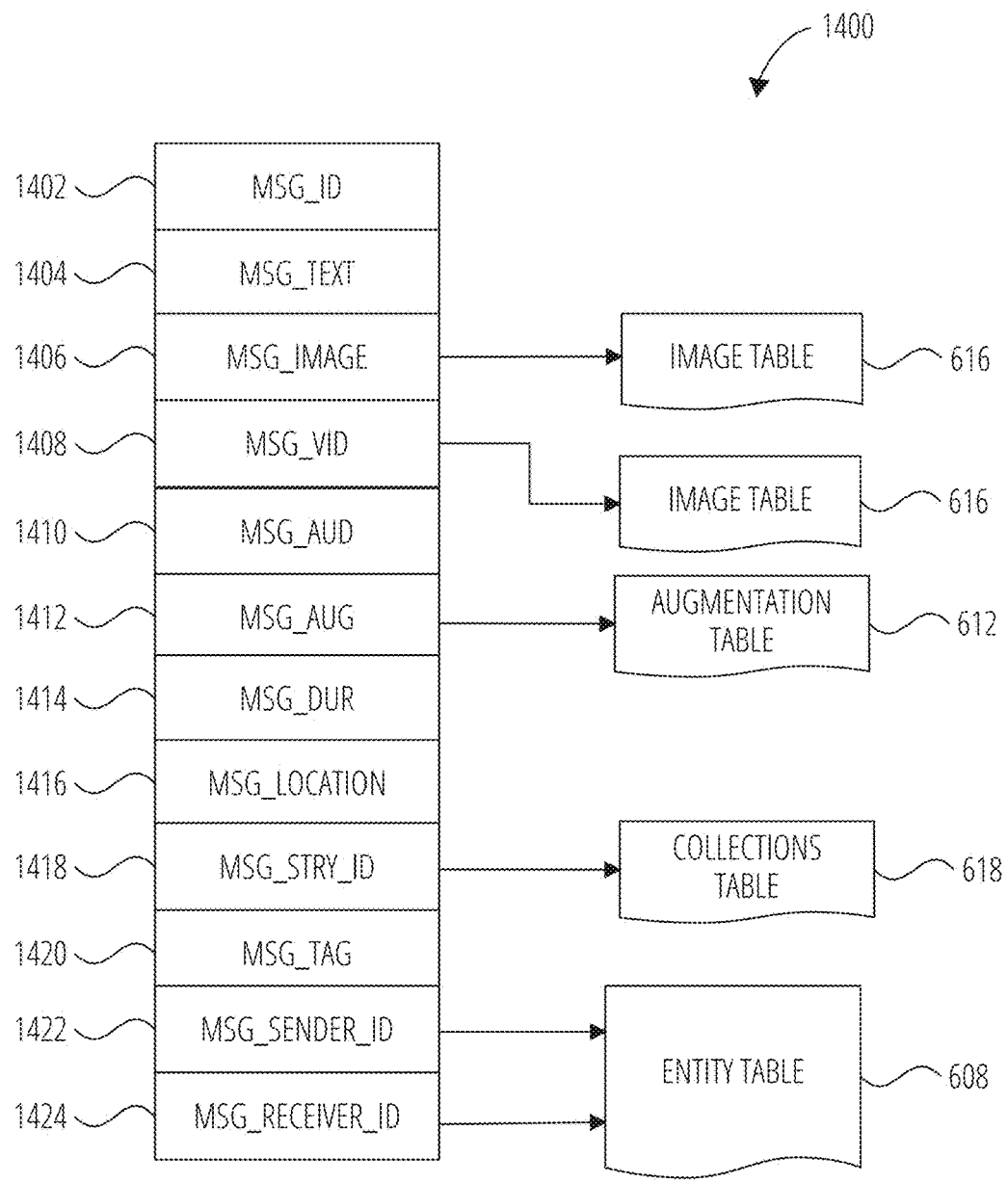
FIG. 14 is a diagrammatic representation of a message, according to some examples.

FIG. 14 is a schematic diagram illustrating a structure of a message 1400, according to some examples, generated by an interaction client 404 for communication to a further interaction client 404 via the interaction servers 424. The content of a particular message 1400 is used to populate the message table 606 stored within the database 604, accessible by the interaction servers 424. Similarly, the content of a message 1400 is stored in memory as "in-transit" or "in-flight" data of the user system 402 or the interaction servers 424. A message 1400 is shown to include the following example components:

- Message identifier 1402: a unique identifier that identifies the message 1400.
- Message text payload 1404: text, to be generated by a user via a user interface of the user system 402, and that is included in the message 1400.
- Message image payload 1406: image data, captured by a camera component of a user system 402 or retrieved from a memory component of a user system 402, and that is included in the message 1400. Image data for a sent or received message 1400 may be stored in the image table 616.
- Message video payload 1408: video data, captured by a camera component or retrieved from a memory component of the user system 402, and that is included in the message 1400. Video data for a sent or received message 1400 may be stored in the image table 616.
- Message audio payload 1410: audio data, captured by a microphone or retrieved from a memory component of the user system 402, and that is included in the message 1400.
- Message augmentation data 1412: augmentation data (e.g., filters, stickers, or other annotations or enhancements) that represents augmentations to be applied to message image payload 1406, message video payload 1408, or message audio payload 1410 of the message 1400. Augmentation data for a sent or received message 1400 may be stored in the augmentation table 612.
- Message duration parameter 1414: parameter value indicating, in seconds, the amount of time for which content of the message (e.g., the message image payload 1406, message video payload 1408, message audio payload 1410) is to be presented or made accessible to a user via the interaction client 404.
- Message geolocation parameter 1416: geolocation data (e.g., latitudinal and longitudinal coordinates) associated with the content payload of the message. Multiple message geolocation parameter 1416 values may be included in the payload, each of these parameter values being associated with respect to content items included in the content (e.g., a specific image within the message image payload 1406, or a specific video in the message video payload 1408).
- Message story identifier 1418: identifier values identifying one or more content collections (e.g., "stories" identified in the collections table 618) with which a particular content item in the message image payload 1406 of the message 1400 is associated. For example, multiple images within the message image payload 1406 may each be associated with multiple content collections using identifier values.

Message tag 1420: each message 1400 may be tagged with multiple tags, each of which is indicative of the subject matter of content included in the message payload. For example, where a particular image included in the message image payload 1406 depicts an animal (e.g., a lion), a tag value may be included within the message tag 1420 that is indicative of the relevant animal. Tag values may be generated manually, based on user input, or may be automatically generated using, for example, image recognition.

Message sender identifier 1422: an identifier (e.g., a messaging system identifier, email address, or device identifier) indicative of a user of the user system 402 on which the message 1400 was generated and from which the message 1400 was sent.

Message receiver identifier 1424: an identifier (e.g., a messaging system identifier, email address, or device identifier) indicative of a user of the user system 402 to which the message 1400 is addressed.

The contents (e.g., values) of the various components of message 1400 may be pointers to locations in tables within which content data values are stored. For example, an image value in the message image payload 1406 may be a pointer to (or address of) a location within an image table 616. Similarly, values within the message video payload 1408 may point to data stored within an image or video table, values stored within the message augmentation data 1412 may point to data stored in an augmentation table 612, values stored within the message story identifier 1418 may point to data stored in a collections table 618, and values stored within the message sender identifier 1422 and the message receiver identifier 1424 may point to user records stored within an entity table 608.

System with Head-Wearable Apparatus

Figure 15:
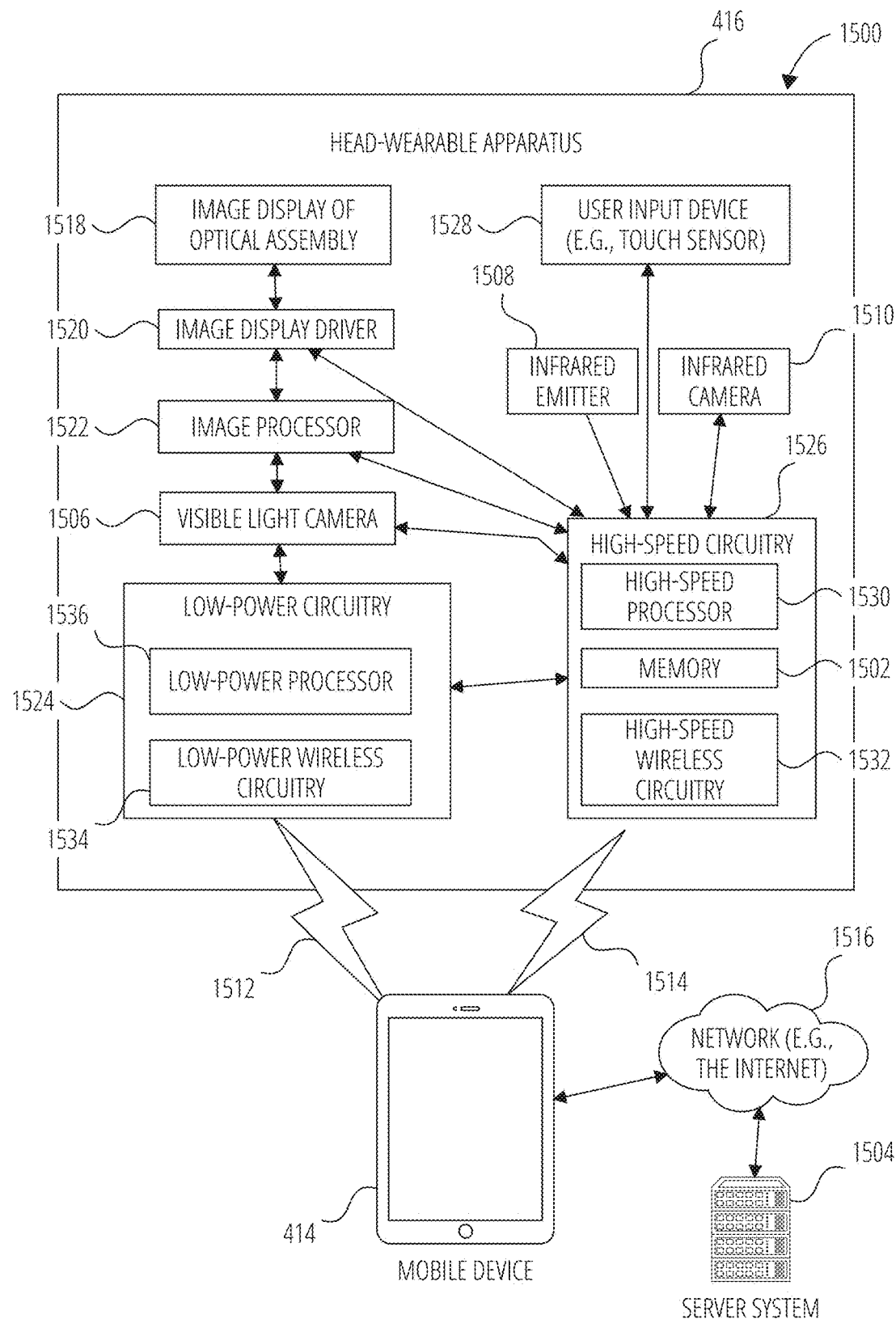
FIG. 15 illustrates a system including a head-wearable apparatus with a selector input device, according to some examples.

FIG. 15 illustrates a system 1500 including a head-wearable apparatus 416 with a selector input device, according to some examples. FIG. 15 is a high-level functional block diagram of an example head-wearable apparatus 416 communicatively coupled to a mobile device 414 and various server systems 1504 (e.g., the interaction server system 410) via various networks 408. The networks 408 may include any combination of wired and wireless connections.

The head-wearable apparatus 416 includes one or more cameras, each of which may be, for example, a visible light camera 1506, an infrared emitter 1508, and an infrared camera 1510.

An interaction client, such as a mobile device 414 connects with head-wearable apparatus 416 using both a low-power wireless connection 1512 and a high-speed wireless connection 1514. The mobile device 414 is also connected to the server system 1504 and the network 1516.

The head-wearable apparatus 416 further includes two image displays of the image display of optical assembly 1518. The two image displays of optical assembly 1518 include one associated with the left lateral side and one associated with the right lateral side of the head-wearable apparatus 416. The head-wearable apparatus 416 also includes an image display driver 1520, an image processor 1522, low-power circuitry 1524, and high-speed circuitry 1526. The image display of optical assembly 1518 is for presenting images and videos, including an image that can include a graphical user interface to a user of the head-wearable apparatus 416.

The image display driver 1520 commands and controls the image display of optical assembly 1518. The image display driver 1520 may deliver image data directly to the image display of optical assembly 1518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 416 includes a frame and stems (or temples) extending from a lateral side of the frame. The head-wearable apparatus 416 further includes a user input device 1528 (e.g., touch sensor or push button), including an input surface on the head-wearable apparatus 416. The user input device 1528 (e.g., touch sensor or push button) is to receive from the user an input selection to manipulate the graphical user interface of the presented image.

The components shown in FIG. 15 for the head-wearable apparatus 416 are located on one or more circuit boards, for example a PCB or flexible PCB, in the rims or temples. Alternatively, or additionally, the depicted components can be located in the chunks, frames, hinges, or bridge of the head-wearable apparatus 416. Left and right visible light cameras 1506 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 416 includes a memory 1502, which stores instructions to perform a subset or all of the functions described herein. The memory 1502 can also include storage device.

As shown in FIG. 15, the high-speed circuitry 1526 includes a high-speed processor 1530, a memory 1502, and high-speed wireless circuitry 1532. In some examples, the image display driver 1520 is coupled to the high-speed circuitry 1526 and operated by the high-speed processor 1530 in order to drive the left and right image displays of the image display of optical assembly 1518. The high-speed processor 1530 may be any processor capable of managing high-speed communications and operation of any general computing system needed for the head-wearable apparatus 416. The high-speed processor 1530 includes processing resources needed for managing high-speed data transfers on a high-speed wireless connection 1514 to a wireless local area network (WLAN) using the high-speed wireless circuitry 1532. In certain examples, the high-speed processor 1530 executes an operating system such as a LINUX operating system or other such operating system of the head-wearable apparatus 416, and the operating system is stored in the memory 1502 for execution. In addition to any other responsibilities, the high-speed processor 1530 executing a software architecture for the head-wearable apparatus 416 is used to manage data transfers with high-speed wireless circuitry 1532. In certain examples, the high-speed wireless circuitry 1532 is configured to implement Institute of Electrical and Electronic Engineers (IEEE) 802.11 communication standards, also referred to herein as WI-FI®. In some examples, other high-speed communications standards may be implemented by the high-speed wireless circuitry 1532.

The low-power wireless circuitry 1534 and the high-speed wireless circuitry 1532 of the head-wearable apparatus 416 can include short-range transceivers (Bluetooth™) and wireless wide, local, or wide area network transceivers (e.g., cellular or WI-FI®). Mobile device 414, including the transceivers communicating via the low-power wireless connection 1512 and the high-speed wireless connection 1514, may be implemented using details of the architecture of the head-wearable apparatus 416, as can other elements of the network 1516.

The memory 1502 includes any storage device capable of storing various data and applications, including, among other things, camera data generated by the left and right visible light cameras 1506, the infrared camera 1510, and the image processor 1522, as well as images generated for display by the image display driver 1520 on the image displays of the image display of optical assembly 1518. While the memory 1502 is shown as integrated with high-speed circuitry 1526, in some examples, the memory 1502 may be an independent standalone element of the head-wearable apparatus 416. In certain such examples, electrical routing lines may provide a connection through a chip that includes the high-speed processor 1530 from the image processor 1522 or the low-power processor 1536 to the memory 1502. In some examples, the high-speed processor 1530 may manage addressing of the memory 1502 such that the low-power processor 1536 will boot the high-speed processor 1530 any time that a read or write operation involving memory 1502 is needed.

As shown in FIG. 15, the low-power processor 1536 or high-speed processor 1530 of the head-wearable apparatus 416 can be coupled to the camera (visible light camera 1506, infrared emitter 1508, or infrared camera 1510), the image display driver 1520, the user input device 1528 (e.g., touch sensor or push button), and the memory 1502.

The head-wearable apparatus 416 is connected to a host computer. For example, the head-wearable apparatus 416 is paired with the mobile device 414 via the high-speed wireless connection 1514 or connected to the server system 1504 via the network 1516. The server system 1504 may be one or more computing devices as part of a service or network computing system, for example, that includes a processor, a memory, and network communication interface to communicate over the network 1516 with the mobile device 414 and the head-wearable apparatus 416.

The mobile device 414 includes a processor and a network communication interface coupled to the processor. The network communication interface allows for communication over the network 1516, low-power wireless connection 1512, or high-speed wireless connection 1514. Mobile device 414 can further store at least portions of the instructions in the mobile device 114's memory to implement the functionality described herein.

Output components of the head-wearable apparatus 416 include visual components, such as a display such as a liquid crystal display (LCD), a plasma display panel (PDP), a light-emitting diode (LED) display, a projector, or a waveguide. The image displays of the optical assembly are driven by the image display driver 1520. The output components of the head-wearable apparatus 416 further include acoustic components (e.g., speakers), haptic components (e.g., a vibratory motor), other signal generators, and so forth. The input components of the head-wearable apparatus 416, the mobile device 414, and server system 1504, such as the user input device 1528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 416 may also include additional peripheral device elements. Such peripheral device elements may include biometric sensors, additional sensors, or display elements integrated with the head-wearable apparatus 416. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1512 and high-speed wireless connection 1514 from the mobile device 414 via the low-power wireless circuitry 1534 or high-speed wireless circuitry 1532.

Machine Architecture

Figure 16:
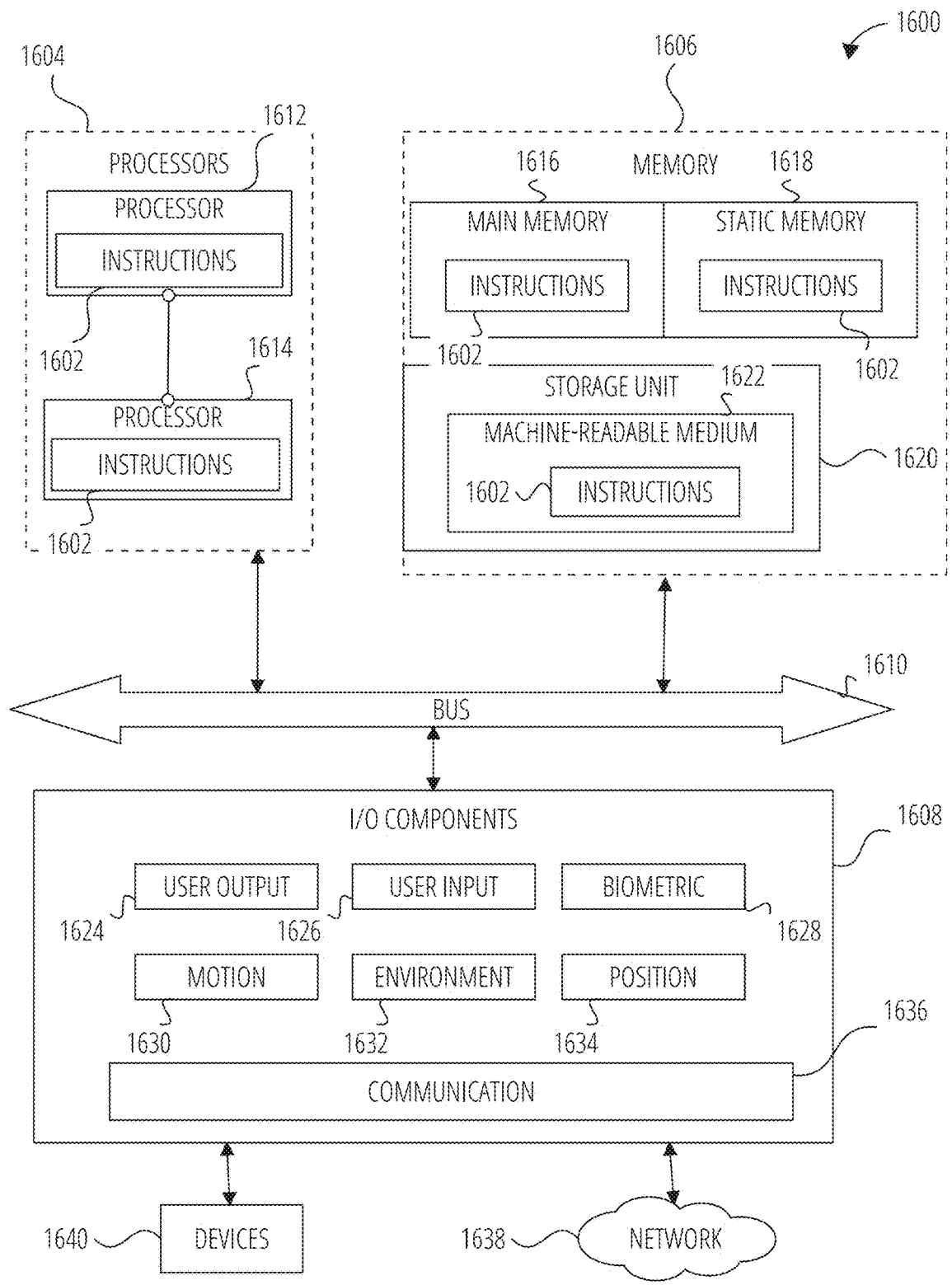
FIG. 16 is a diagrammatic representation of a machine in the form of a computer system within which a set of instructions may be executed to cause the machine to perform any one or more of the methodologies discussed herein, according to some examples.

FIG. 16 is a diagrammatic representation of the machine 1600 within which instructions 1602 (e.g., software, a program, an application, an applet, an app, or other executable code) for causing the machine 1600 to perform any one or more of the methodologies discussed herein may be executed. For example, the instructions 1602 may cause the machine 1600 to execute any one or more of the methods described herein. The instructions 1602 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1602, sequentially or otherwise, that specify actions to be taken by the machine 1600. Further, while a single machine 1600 is illustrated, the term "machine" shall also be taken to include a collection of machines that individually or jointly execute the instructions 1602 to perform any one or more of the methodologies discussed herein. The machine 1600, for example, may comprise the user system 402 or any one of multiple server devices forming part of the interaction server system 410. In some examples, the machine 1600 may also comprise both client and server systems, with certain operations of a particular method or algorithm being performed on the server-side and with certain operations of the particular method or algorithm being performed on the client-side.

The machine 1600 may include processors 1604, memory 1606, and input/output I/O components 1608, which may be configured to communicate with each other via a bus 1610. In an example, the processors 1604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1612 and a processor 1614 that execute the instructions 1602. The term "processor" is intended to include multi-core processors that may comprise two or more independent processors (sometimes referred to as "cores") that may execute instructions contemporaneously. Although FIG. 16 shows multiple processors 1604, the machine 1600 may include a single processor with a single-core, a single processor with multiple cores (e.g., a multi-core processor), multiple processors with a single core, multiple processors with multiples cores, or any combination thereof.

The memory 1606 includes a main memory 1616, a static memory 1618, and a storage unit 1620, both accessible to the processors 1604 via the bus 1610. The main memory 1606, the static memory 1618, and storage unit 1620 store the instructions 1602 embodying any one or more of the methodologies or functions described herein. The instructions 1602 may also reside, completely or partially, within the main memory 1616, within the static memory 1618, within machine-readable medium 1622 within the storage unit 1620, within at least one of the processors 1604 (e.g., within the processor's cache memory), or any suitable combination thereof, during execution thereof by the machine 1600.

The I/O components 1608 may include a wide variety of components to receive input, provide output, produce output, transmit information, exchange information, capture measurements, and so on. The specific I/O components 1608 that are included in a particular machine will depend on the type of machine. For example, portable machines such as mobile phones may include a touch input device or other such input mechanisms, while a headless server machine will likely not include such a touch input device. It will be appreciated that the I/O components 1608 may include many other components that are not shown in FIG. 16. In various examples, the I/O components 1608 may include user output components 1624 and user input components 1626. The user output components 1624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1608 may include biometric components 1628, motion components 1630, environmental components 1632, or position components 1634, among a wide array of other components. For example, the biometric components 1628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1630 include acceleration sensor components (e.g., accelerometer), gravitation sensor components, rotation sensor components (e.g., gyroscope).

The environmental components 1632 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

With respect to cameras, the user system 402 may have a camera system comprising, for example, front cameras on a front surface of the user system 402 and rear cameras on a rear surface of the user system 402. The front cameras may, for example, be used to capture still images and video of a user of the user system 402 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 402 may also include a 360° camera for capturing 360° photographs and videos.

Further, the camera system of the user system 402 may include dual rear cameras (e.g., a primary camera as well as a depth-sensing camera), or even triple, quad or penta rear camera configurations on the front and rear sides of the user system 402. These multiple cameras systems may include a wide camera, an ultra-wide camera, a telephoto camera, a macro camera, and a depth sensor, for example.

The position components 1634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1608 further include communication components 1636 operable to couple the machine 1600 to a network 1638 or devices 1640 via respective coupling or connections. For example, the communication components 1636 may include a network interface component or another suitable device to interface with the network 1638. In further examples, the communication components 1636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1640 may be another machine or any of a wide variety of peripheral devices (e.g., a peripheral device coupled via a USB).

Moreover, the communication components 1636 may detect identifiers or include components operable to detect identifiers. For example, the communication components 1636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1636, such as location via Internet Protocol (IP) geolocation, location via Wi-Fi® signal triangulation, location via detecting an NFC beacon signal that may indicate a particular location, and so forth.

The various memories (e.g., main memory 1616, static memory 1618, and memory of the processors 1604) and storage unit 1620 may store one or more sets of instructions and data structures (e.g., software) embodying or used by any one or more of the methodologies or functions described herein. These instructions (e.g., the instructions 1602), when executed by processors 1604, cause various operations to implement the disclosed examples.

The instructions 1602 may be transmitted or received over the network 1638, using a transmission medium, via a network interface device (e.g., a network interface component included in the communication components 1636) and using any one of several well-known transfer protocols (e.g., hypertext transfer protocol (HTTP)). Similarly, the instructions 1602 may be transmitted or received using a transmission medium via a coupling (e.g., a peer-to-peer coupling) to the devices 1640.

Software Architecture

Figure 17:
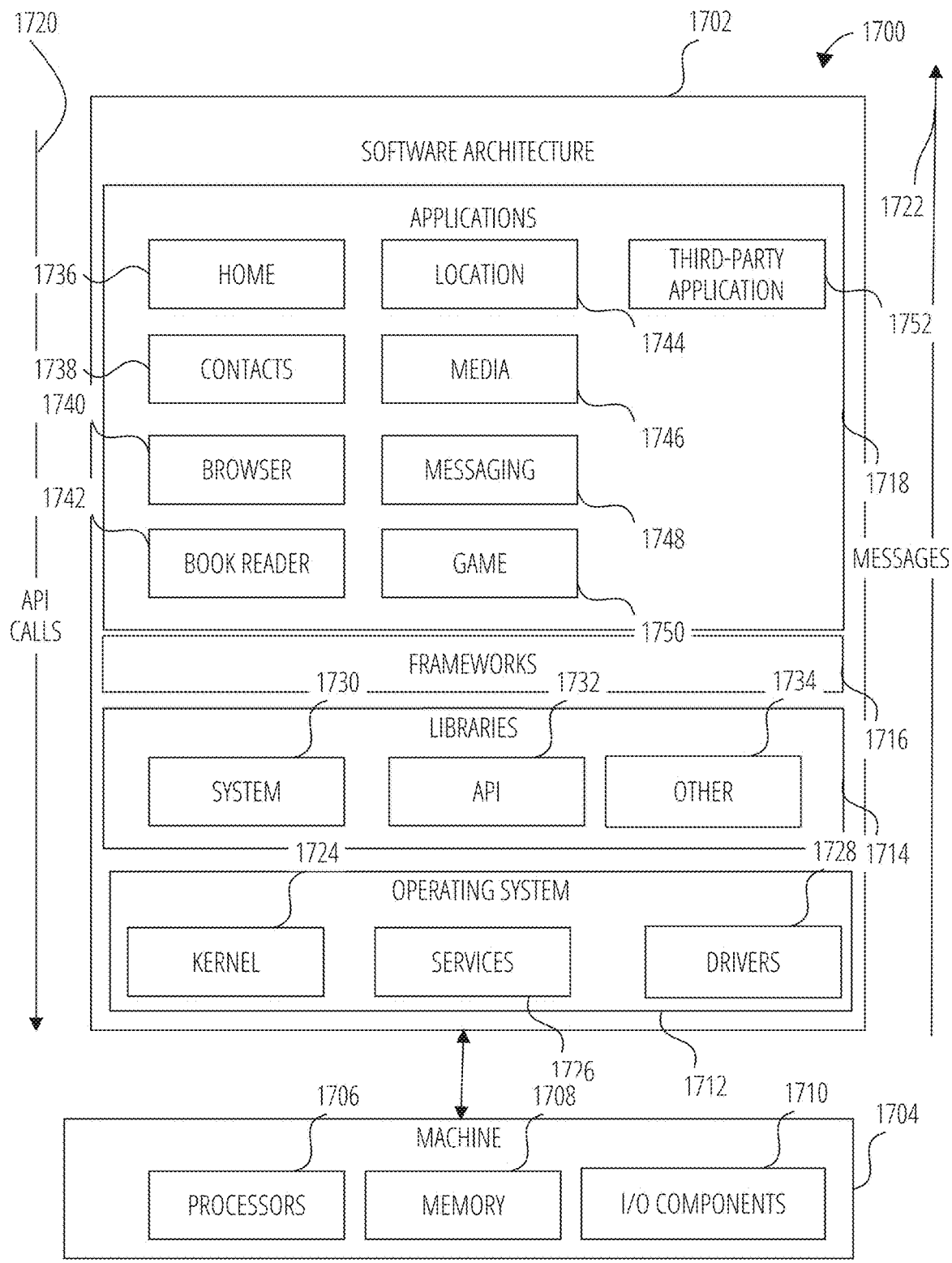
FIG. 17 is a block diagram showing a software architecture within which examples may be implemented.

FIG. 17 is a block diagram 1700 illustrating a software architecture 1702, which can be installed on any one or more of the devices described herein. The software architecture 1702 is supported by hardware such as a machine 1704 that includes processors 1706, memory 1708, and I/O components 1710. In this example, the software architecture 1702 can be conceptualized as a stack of layers, where each layer provides a particular functionality. The software architecture 1702 includes layers such as an operating system 1712, libraries 1714, frameworks 1716, and applications 1718. Operationally, the applications 1718 invoke API calls 1720 through the software stack and receive messages 1722 in response to the API calls 1720.

The operating system 1712 manages hardware resources and provides common services. The operating system 1712 includes, for example, a kernel 1724, services 1726, and drivers 1728. The kernel 1724 acts as an abstraction layer between the hardware and the other software layers. For example, the kernel 1724 provides memory management, processor management (e.g., scheduling), component management, networking, and security settings, among other functionalities. The services 1726 can provide other common services for the other software layers. The drivers 1728 are responsible for controlling or interfacing with the underlying hardware. For instance, the drivers 1728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1714 provide a common low-level infrastructure used by the applications 1718. The libraries 1714 can include system libraries 1730 (e.g., C standard library) that provide functions such as memory allocation functions, string manipulation functions, mathematic functions, and the like. In addition, the libraries 1714 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1714 can also include a wide variety of other libraries 1734 to provide many other APIs to the applications 1718.

The frameworks 1716 provide a common high-level infrastructure that is used by the applications 1718. For example, the frameworks 1716 provide various graphical user interface (GUI) functions, high-level resource management, and high-level location services. The frameworks 1716 can provide a broad spectrum of other APIs that can be used by the applications 1718, some of which may be specific to a particular operating system or platform.

In an example, the applications 1718 may include a home application 1736, a contacts application 1738, a browser application 1740, a book reader application 1742, a location application 1744, a media application 1746, a messaging application 1748, a game application 1750, and a broad assortment of other applications such as a third-party application 1752. The applications 1718 are programs that execute functions defined in the programs. Various programming languages can be employed to create one or more of the applications 1718, structured in a variety of manners, such as object-oriented programming languages (e.g., Objective-C, Java, or C++) or procedural programming languages (e.g., C or assembly language). In a specific example, the third-party application 1752 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1752 can invoke the API calls 1720 provided by the operating system 1712 to facilitate functionalities described herein.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: establishing a communications connection between an external two-dimensional (2D) display system and an Augmented Reality (AR) device, the external 2D display system being external to the AR device; identifying a pose of an external 2D display of the external 2D display system; receiving user input from a user of the AR device associated with an interaction with a virtual object located within a real-world environment; identifying one or more locations of corresponding viewers of the external 2D display within the real-world environment; generating display data of the virtual object for the external 2D display based on the pose of the external 2D display, the one or more locations of the corresponding viewers, and the user input; and transmitting the display data to the external 2D display system causing display of a rendering of the virtual object on the external 2D display to the identified one or more viewers.

In Example 2, the subject matter of Example 1 including, D display and the AR device.

In Example 3, the subject matter of Examples 1-2 including, wherein the operations further comprise: identifying a spatial position of the 2D display; processing data from one or more internal sensors of the AR device to generate a spatial position and pose of the AR device; and generating a relative spatial position of the 2D display and the AR device based on the spatial position and pose of the AR device and the spatial position and the pose of the 2D display, wherein generating display data of the virtual object is based on the relative spatial position of the 2D display and the AR device.

In Example 4, the subject matter of Example 3 including, wherein the one or more internal sensors of the AR device include an accelerometer, a gyroscope, and a camera, wherein the AR device performs pose estimation using SLAM (Simultaneous Localization and Mapping) to estimate the device's pose by combining data from the accelerometer and gyroscope with visual data from the camera.

In Example 5, the subject matter of Examples 1-4 including, D display comprises: capturing, by the AR device, an image from a camera of the AR device; processing the image to identify one or more markers; identifying one or more characteristics of the external 2D display from the identified one or more markers; and determining the pose of the external 2D display.

In Example 6, the subject matter of Examples 1-5 includes, wherein the operations further comprise: processing an image of the external 2D display captured by the AR device to identify an object displayed on the external 2D display and the object's displayed dimensions; accessing known dimensions of the object being displayed on the external 2D display; and based on the known dimensions and the displayed dimension of the object, determining a pixel resolution of the external 2D display, wherein generating the display data is based on the pixel resolution of the external 2D display.

In Example 7, the subject matter of Examples 1-6 including, D display.

In Example 8, the subject matter of Examples 1-7 includes, wherein the operations further comprise: continuously monitoring user interactions with virtual objects via the AR device; and in response to a predetermined time period elapsing without direct user interaction of a first virtual object, changing the display of the first virtual object.

In Example 9, the subject matter of Examples 1-8 includes, wherein the operations further comprise receiving another user input from another user of another AR device associated with another interaction with the virtual object located within the real-world environment, wherein generating the display data is further based on the other user input from the other user of the other AR device.

In Example 10, the subject matter of Examples 1-9 including, D display, wherein identifying the one or more locations of the corresponding viewers and identifying the relative position of the viewers with the external 2D display is based on images captured by a camera of the AR device.

In Example 11, the subject matter of Examples 1-10 including, wherein the operations further comprise: identifying a center view line for the external 2D display, and based on the one or more locations of the viewers, identify a relative position of individual viewers with respect to the center view line, wherein generating the display data is based on the relative position of the individual viewers.

In Example 12, the subject matter of Examples 1-11 including, wherein the operations further comprise: based on the one or more locations of corresponding viewers, identifying a focal point for the plurality of viewers, wherein generating the display data of the virtual object for the external 2D display is based on the identified focal point for the plurality of viewers.

In Example 13, the subject matter of Example 12 includes, wherein generating the display data of the virtual object comprises enlarging a portion of the virtual object based on the focal point for the plurality of viewers.

In Example 14, the subject matter of Examples 12-13 including, wherein generating the display data of the virtual object comprises skewing a portion of the virtual object based on the focal point for the plurality of viewers.

In Example 15, the subject matter of Examples 12-14 including, wherein generating the display data of the virtual object comprises adjusting a brightness of a portion of the virtual object based on the focal point for the plurality of viewers.

In Example 16, the subject matter of Examples 12-15 including, wherein identifying the focal point comprises: identifying movement of the viewers using a machine learning model trained to track movement patterns of viewers within captured video frames; and identifying the focal point to the movements of the viewers towards a particular focal point.

In Example 17, the subject matter of Examples 1-16 including, wherein the operations further comprise: a plurality of viewer groups based on the locations of the viewers, including a first group and a second group; determining a first focal point for the first group; and determining a second focal point for the second group; wherein generating the display data of the virtual object comprises generating a first modified virtual object for the first focal group and generating a second modified virtual object for the second group, and causing the simultaneously display of the first modified virtual object and the second modified virtual object on the external 2D display.

In Example 18, the subject matter of Examples 1-17 including, wherein the operations further comprise: performing feature extraction on the display data to identify reference points and their description; causing display of tags serving as reference points; and performing, by the AR device, relocalization based on images captured from a camera of the AR device and tags identified in the images.

Example 19 is a method comprising: establishing a communications connection between an external two-dimensional (2D) display system and an Augmented Reality (AR) device, the external 2D display system being external to the AR device; identifying a pose of an external 2D display of the external 2D display system; receiving user input from a user of the AR device associated with an interaction with a virtual object located within a real-world environment; identifying one or more locations of corresponding viewers of the external 2D display within the real-world environment; generating display data of the virtual object for the external 2D display based on the pose of the external 2D display, the one or more locations of the corresponding viewers, and the user input; and transmitting the display data to the external 2D display system causing display of a rendering of the virtual object on the external 2D display to the identified one or more viewers.

Example 20 is a non-transitory computer-readable storage medium storing instructions that, when executed by at least one processor, cause the at least one processor to perform operations comprising: establishing a communications connection between an external two-dimensional (2D) display system and an Augmented Reality (AR) device, the external 2D display system being external to the AR device; identifying a pose of an external 2D display of the external 2D display system; receiving user input from a user of the AR device associated with an interaction with a virtual object located within a real-world environment; identifying one or more locations of corresponding viewers of the external 2D display within the real-world environment; generating display data of the virtual object for the external 2D display based on the pose of the external 2D display, the one or more locations of the corresponding viewers, and the user input; and transmitting the display data to the external 2D display system causing display of a rendering of the virtual object on the external 2D display to the identified one or more viewers.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

CONCLUSION

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:
   at least one processor; and
   at least one memory component storing instructions that, when executed by the at least one processor, cause the at least one processor to perform operations comprising:
   establishing a communications connection between an external display system and an Augmented Reality (AR) device, the external display system being external to the AR device;
   identifying a pose of an external display of the external display system;
   receiving user input from a user of the AR device associated with an interaction with a virtual object located within a real-world environment;
   identifying one or more locations of corresponding viewers of the external display within the real-world environment;
   generating display data of the virtual object for the external display based on the pose of the external display, the one or more locations of the corresponding viewers, and the user input; and
   transmitting the display data to the external display system causing display of a rendering of the virtual object on the external display to the identified viewers.

2. The system of claim 1, wherein the identification of the pose of the external display is based on the communication connection established between the external display and the AR device.

3. The system of claim 1, wherein the operations further comprise:
   identifying a spatial position of the display;
   processing data from one or more internal sensors of the AR device to generate a spatial position and pose of the AR device; and
   generating a relative spatial position of the display and the AR device based on the spatial position and pose of the AR device and the spatial position and the pose of the display, wherein generating display data of the virtual object is based on the relative spatial position of the display and the AR device.

4. The system of claim 3, wherein the one or more internal sensors of the AR device include an accelerometer, a gyroscope, and a camera, wherein the AR device performs pose estimation using SLAM (Simultaneous Localization and Mapping) to estimate the device's pose by combining data from the accelerometer and gyroscope with visual data from the camera.

5. The system of claim 1, wherein identifying the pose of the external display comprises:
   capturing, by the AR device, an image from a camera of the AR device;
   processing the image to identify one or more markers;
   identifying one or more characteristics of the external display from the identified one or more markers; and
   determining the pose of the external display.

6. The system of claim 1, wherein the operations further comprise:
   processing an image of the external display captured by the AR device to identify an object displayed on the external display and the object's displayed dimensions;
   accessing known dimensions of the object being displayed on the external 2D display; and
   based on the known dimensions and the displayed dimension of the object, determining a pixel resolution of the external display, wherein generating the display data is based on the pixel resolution of the external display.

7. The system of claim 1, wherein the user input is received from the user of the AR device is via a virtual AR controller, and wherein the operations further comprise causing display of the virtual AR controller to the user of the AR device via an AR display on the AR device without causing display of the virtual AR controller on the external display.

8. The system of claim 1, wherein the operations further comprise:
   continuously monitoring user interactions with virtual objects via the AR device; and
   in response to a predetermined time period elapsing without direct user interaction of a first virtual object, changing the display of the first virtual object.

9. The system of claim 1, wherein the operations further comprise receiving another user input from another user of another AR device associated with another interaction with the virtual object located within the real-world environment, wherein generating the display data is further based on the other user input from the other user of the other AR device.

10. The system of claim 1, wherein the operations further comprise identifying a relative position of the viewers with the external display,
    wherein identifying the one or more locations of the corresponding viewers and identifying the relative position of the viewers with the external display is based on images captured by a camera of the AR device.

11. The system of claim 1, wherein the operations further comprise:
    identifying a center view line for the external display, and
    based on the one or more locations of the viewers, identify a relative position of individual viewers with respect to the center view line,
    wherein generating the display data is based on the relative position of the individual viewers.

12. The system of claim 1, wherein the operations further comprise:
    based on the one or more locations of corresponding viewers, identifying a focal point for the plurality of viewers,
    wherein generating the display data of the virtual object for the external display is based on the identified focal point for the plurality of viewers.

13. The system of claim 12, wherein generating the display data of the virtual object comprises enlarging a portion of the virtual object based on the focal point for the plurality of viewers.

14. The system of claim 12, wherein generating the display data of the virtual object comprises skewing a portion of the virtual object based on the focal point for the plurality of viewers.

15. The system of claim 12, wherein generating the display data of the virtual object comprises adjusting a brightness of a portion of the virtual object based on the focal point for the plurality of viewers.

16. The system of claim 12, wherein identifying the focal point comprises:
    identifying movement of the viewers using a machine learning model trained to track movement patterns of viewers within captured video frames; and
    identifying the focal point to the movements of the viewers towards a particular focal point.

17. The system of claim 1, wherein the operations further comprise:
    a plurality of viewer groups based on the locations of the viewers, including a first group and a second group;
    determining a first focal point for the first group; and
    determining a second focal point for the second group;
    wherein generating the display data of the virtual object comprises generating a first modified virtual object for the first focal group and generating a second modified virtual object for the second group, and causing the simultaneously display of the first modified virtual object and the second modified virtual object on the external display.

18. The system of claim 1, wherein the operations further comprise:
    performing feature extraction on the display data to identify reference points and associated appearance characteristics;
    causing display of tags serving as reference points; and
    performing, by the AR device, re-localization based on images captured from a camera of the AR device and reference points identified in the images.

19. A method comprising:
    establishing a communications connection between an external display system and an Augmented Reality (AR) device, the external display system being external to the AR device;
    identifying a pose of an external display of the external display system;
    receiving user input from a user of the AR device associated with an interaction with a virtual object located within a real-world environment;
    identifying one or more locations of corresponding viewers of the external display within the real-world environment;
    generating display data of the virtual object for the external display based on the pose of the external display, the one or more locations of the corresponding viewers, and the user input; and
    transmitting the display data to the external display system causing display of a rendering of the virtual object on the external display to the identified viewers.

20. A non-transitory computer-readable storage medium storing instructions that, when executed by at least one processor, cause the at least one processor to perform operations comprising:
    establishing a communications connection between an external display system and an Augmented Reality (AR) device, the external display system being external to the AR device;
    identifying a pose of an external display of the external display system;
    receiving user input from a user of the AR device associated with an interaction with a virtual object located within a real-world environment;
    identifying one or more locations of corresponding viewers of the external display within the real-world environment;
    generating display data of the virtual object for the external display based on the pose of the external display, the one or more locations of the corresponding viewers, and the user input; and
    transmitting the display data to the external display system causing display of a rendering of the virtual object on the external display to the identified viewers.

* * * * *